United States Patent
Thomsen et al.

(10) Patent No.: US 12,055,924 B2
(45) Date of Patent: Aug. 6, 2024

(54) EDGE APPLICATION DISCOVERING AND MANAGEMENT STATE MACHINE OBJECTS IN AUTOMATION CONTROLLERS FOR MES AND DCS APPLICATIONS

(71) Applicant: Rockwell Automation Technologies, Inc., Mayfield Heights, OH (US)

(72) Inventors: Joachim Thomsen, Karlsruhe (DE); Stephen C Briant, Corapolis, PA (US); Martin Petrick, Reinheim (DE); Frank Jordan, Erkrath (DE); Manuel Sukerman, Lisle, IL (US); Daniel J Aardsma, Indianapolis, IN (US); John B Dart, Milwaukee, WI (US); Derrick Tapscott, Kiln Farm (GB); James Butler, Glanmire (IE)

(73) Assignee: Rockwell Automation Technologies, Inc.

( * ) Notice: Subject to any disclaimer, the term of this patent is extended or adjusted under 35 U.S.C. 154(b) by 308 days.

(21) Appl. No.: 17/507,097

(22) Filed: Oct. 21, 2021

(65) Prior Publication Data
US 2023/0131783 A1 Apr. 27, 2023

(51) Int. Cl.
*G05B 19/418* (2006.01)
(52) U.S. Cl.
CPC ..... *G05B 19/4188* (2013.01); *G05B 19/4183* (2013.01); *G05B 19/4185* (2013.01)
(58) Field of Classification Search
CPC ............ G05B 19/4188; G05B 19/4183; G05B 19/4185; G05B 19/0425; G05B 19/41885
See application file for complete search history.

(56) References Cited

U.S. PATENT DOCUMENTS

| 2003/0033437 A1* | 2/2003 | Fischer | G06F 16/84 |
| | | | 719/310 |
| 2004/0153536 A1* | 8/2004 | Strassner | H04L 41/0813 |
| | | | 709/223 |

(Continued)

OTHER PUBLICATIONS

Extended European Search Report received for European Patent Application Serial No. 22200845.0 dated Mar. 17, 2023, 8 pages.

(Continued)

*Primary Examiner* — Christopher E. Everett
(74) *Attorney, Agent, or Firm* — Amin, Turocy & Watson, LLP

(57) ABSTRACT

A state machine management component that executes on an edge device within an industrial facility is capable of discovering state machines defined on industrial controllers and translating the state machine definitions to information models that allow the state machines to be discovered and utilized by remote client applications. The edge-level information models allow the client applications to render or consume the state machine data generated by the controller, graphically render the state machines, submit commands, or set values, to the controller as state machine commands via the edge device. The edge-level system thus allows client applications with no prior knowledge of the control-level state machines to discover, retrieve, and interact with state machines defined on the industrial controllers.

20 Claims, 18 Drawing Sheets

(56) References Cited

U.S. PATENT DOCUMENTS

| | | | |
|---|---|---|---|
| 2008/0263524 A1* | 10/2008 | Adams | G06F 8/00 717/160 |
| 2012/0079461 A1* | 3/2012 | Copass | G06F 16/955 717/136 |
| 2013/0080139 A1* | 3/2013 | Novaes | G06F 13/10 703/20 |
| 2014/0280528 A1* | 9/2014 | Brandes | G05B 19/056 709/204 |
| 2015/0227617 A1 | 8/2015 | Copass et al. | |

OTHER PUBLICATIONS

Furlani, Cita M.,"Hierarchical Control System Emulation : User's Manual NBS IR 85-3156", National Bureau of Standards, Jan. 1985, 140 pages.

Mortel-Fronczak et al.,"Supervisor Synthesis in Model-Based Automotive Systems Engineering", IEEE, Apr. 14-17, 2014, 12 pages.

Communication pursuant to Rule 69 EPC received for European Patent Application Serial No. 22200845.0 dated May 3, 2023, 2 pages.

Communication Pursuant to Article 94(3) EPC received for EP Patent Application Serial No. 22200845.0 dated May 2, 2024, 6 pages.

* cited by examiner

EDGE APPLICATION DISCOVERING AND MANAGEMENT STATE MACHINE OBJECTS IN AUTOMATION CONTROLLERS FOR MES AND DCS APPLICATIONS

BACKGROUND

The subject matter disclosed herein relates generally to industrial automation systems, and, for example, to configuration, execution, and discovery of control-level state machines.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to discover and retrieve a state machine definition from an industrial controller via a plant network; a translation component configured to translate the state machine definition to an information model, the information model defining states, transitions, and commands of the state machine definition in a format that is discoverable, readable, and writable by client applications that remotely access the system; and a client interface component configured to render the information model accessible to the client applications that remotely access the system.

Also, one or more embodiments provide a method, comprising discovering and retrieving, by an edge device comprising a processor, a state machine definition from an industrial controller via a plant network; translating, by the edge device, the state machine definition to an information model that defines states, transitions, and commands of the state machine definition in a format that is discoverable, readable, and writable by client applications that remotely access the edge device; and rendering, by the edge device, the information model accessible to the client applications that remotely access the edge device.

Also, according to one or more embodiments, a non-transitory computer-readable medium is provided having stored thereon instructions that, in response to execution, cause an edge device to perform operations, the operations comprising discovering and retrieving a state machine definition from an industrial controller via a plant network; translating the state machine definition to an information model that defines states, transitions, and commands of the state machine definition in a format that is discoverable, readable, and writable by client applications that remotely access the edge device; and rendering the information model accessible to the client applications that remotely access the edge device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
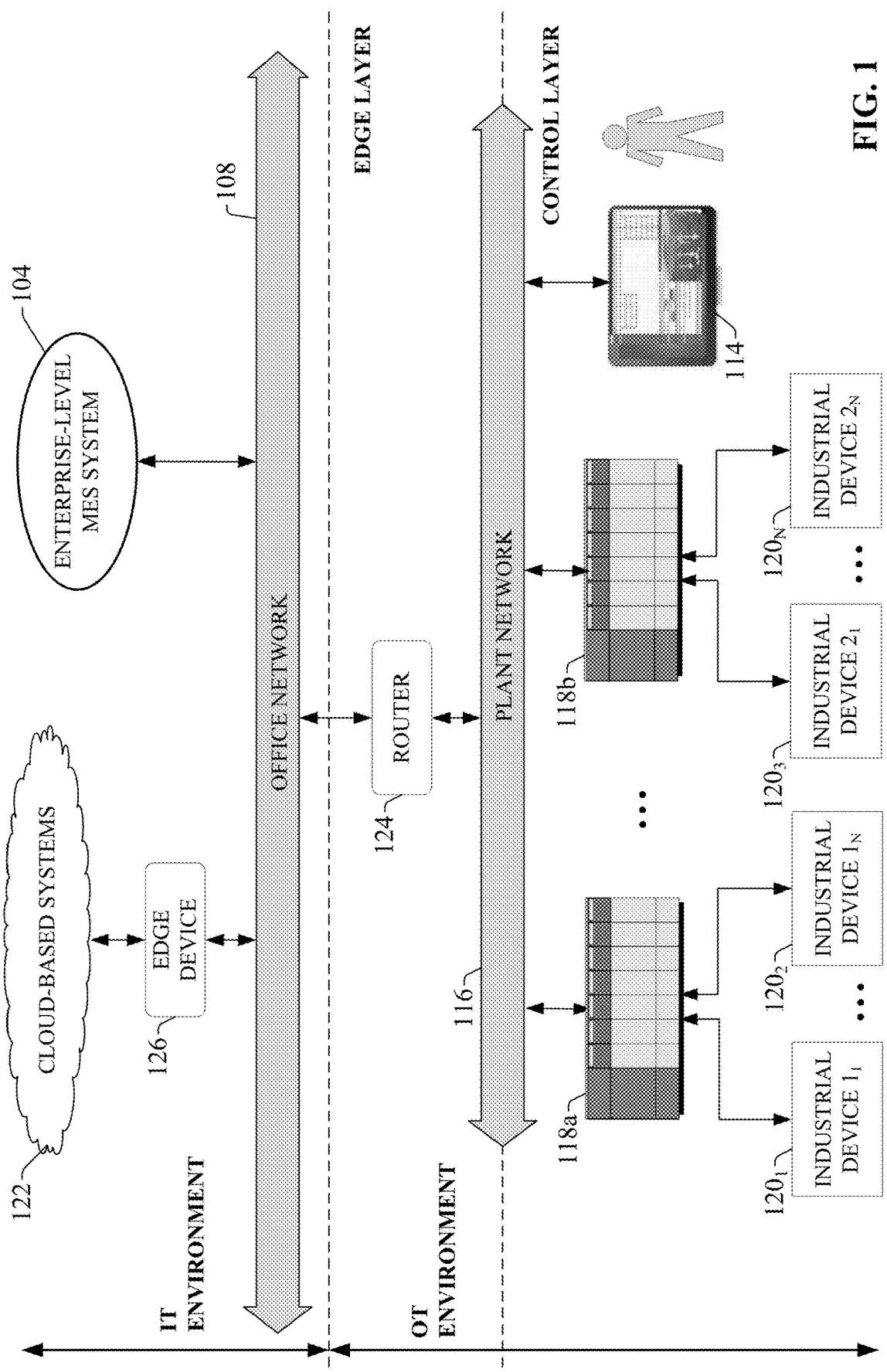
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). Some industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on a cloud platform 122 or on an office network 108 (which may be connected to the plant network 116 via a router 124 or other network infrastructure device). Such higher level systems can include, for example, enterprise resource planning (ERP) systems that integrate and collectively manage high-level business operations, such as finance, sales, order management, marketing, human resources, or other such business functions. Manufacturing Execution Systems (IVIES) 104 can monitor and manage control operations on the control level given higher-level business considerations.

In some architectures, selected sets of data generated by the industrial controllers 118 or their associated industrial devices 120 can be sent to remote applications or systems that execute on the cloud platform 112. Such cloud-based systems can include, for example, remote visualization systems, reporting systems IVIES systems, industrial internet-of-things (IIoT) systems, remote supervisory control systems, or other such cloud services. In such architectures, one or more edge devices 126 may reside on either the office network 108 or the plant network 116 and aggregate industrial data from these plant-floor devices for migration to these cloud-based systems or applications. In general, edge devices 126 act as gateways between data on the plant floor devices and the cloud-based systems that consume this data. The edge device 126 may also be used as a computing platform to host other applications that process data collected from the plant network before being passed on to the higher level cloud systems.

Integration of cloud-based systems or applications with control-level devices at an industrial facility often necessitates laborious and time-consuming development work, requiring a level of expertise beyond most end users of the applications. This integration work is complicated by such factors as the proprietary nature of the data schemas within the industrial devices, difficulties in extracting meaning from unstructured or uncontextualized sets of industrial data, incompatibility of technologies, or other such factors. Although standardizing these interfaces can reduce the burden of integration, standardization may also limit flexibility and stifle innovation.

To address these and other issues, one or more embodiments described herein provide an edge-level state machine management system capable of discovering state machine definitions on industrial controllers and translating these state machine definitions to standardized information models that can be exposed to and understood by cloud-based systems and applications. This edge-level system can simplify integration of systems—e.g., remote visualization systems, IVIES systems, remote control systems, cloud-based systems, etc.—with the industrial data on the plant floor. To this end, a development environment that supports the use of smart objects can be used to build, deploy, and validate state machines for execution on industrial controllers, and these state machines can be discovered by an edge-level management system and translated to a standardized information model. The state machines can be built on the control layer using modular components that are consistent in their form and behavior and that allow the relational model to be discovered and understood by external client applications (e.g., information applications, SCADA systems, manufacturing operations management systems, distributed control systems, etc.).

Figure 2:
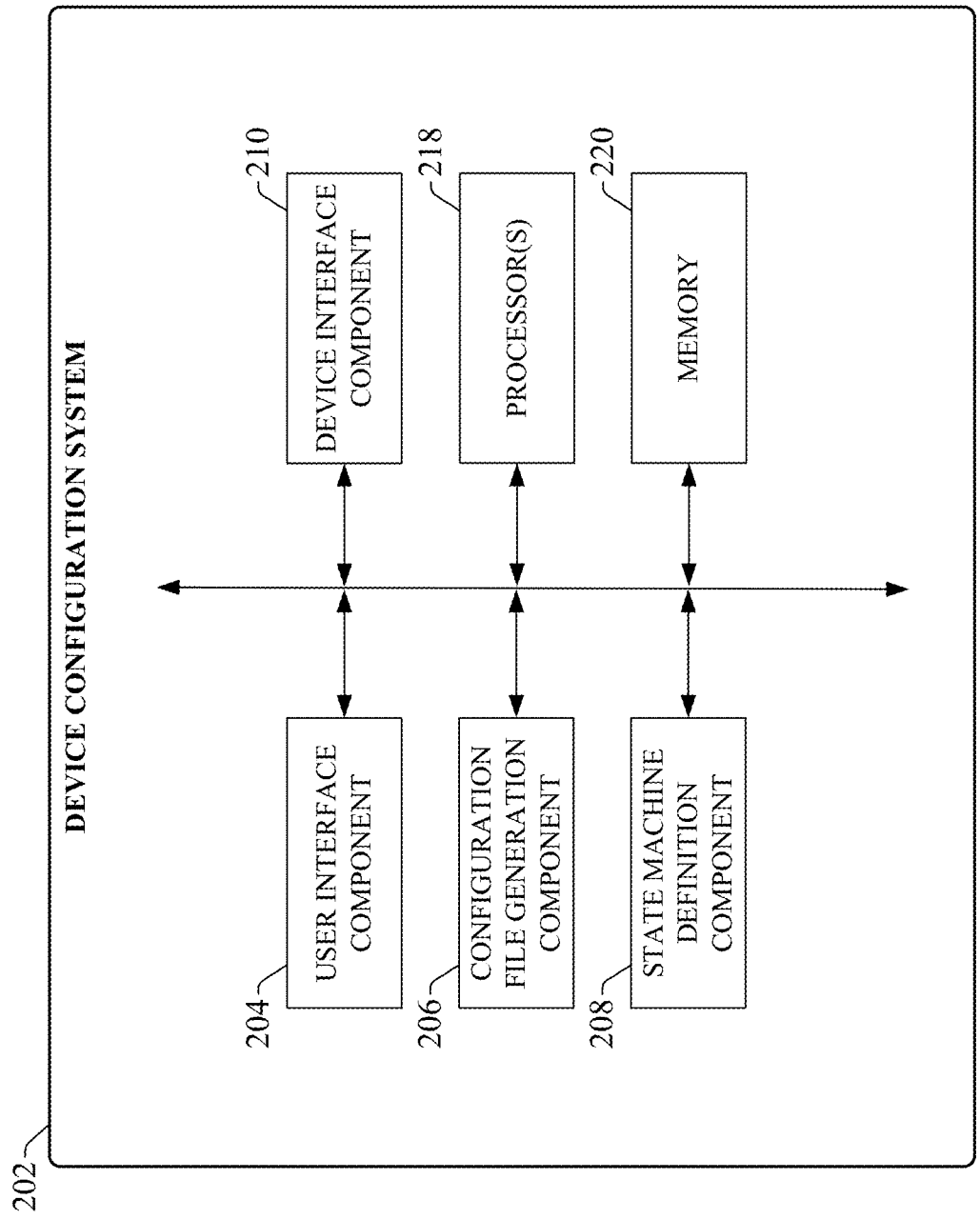
FIG. 2 is a block diagram of an example device configuration system that can be used to configure and program an industrial controller.

FIG. 2 is a block diagram of an example device configuration system 202 that can be used to configure and program an industrial controller according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Device configuration system 202 can include a user interface component 204, a configuration file generation component 206, a state machine definition component 208, a device interface component 210, one or more processors 218, and memory 220. In various embodiments, one or more of the user interface component 204, configuration file generation component 206, state machine definition component 208, device interface component 210, the one or more processors 218, and memory 220 can be electrically and/or communicatively coupled to one another to perform one or more of the functions of the device configuration system 202. In some embodiments, components 204, 206, 208, and 210 can comprise software instructions stored on memory 220 and executed by processor(s) 218. Device configuration system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the device configuration system 202 (e.g., via a hardwired or wireless connection). The user interface component 204 can then serve development interface displays to the client device (e.g., interface displays associated with a control project development environment) and exchange data via these interface screens. Input data that can be received via various embodiments of user interface component 204 can include, but is not limited to, programming code (including industrial control programming, such as ladder logic programming), device configuration data, state machine definitions, or other such input. Output data rendered by various embodiments of user interface component 204 can include program code, programming feedback (e.g., error and highlighting, coding suggestions, etc.), device configuration parameters, or other such output.

Configuration file generation component 206 can be configured to generate a device configuration file based on the configuration and programming input received by the user interface component 204. The configuration file can include device configuration parameter settings (e.g., network settings, I/O configuration settings, etc.), data tag definitions for creation of a tag database, and an industrial control program that can be downloaded to an industrial controller to facilitate configuration and programming of the controller.

State machine definition component 208 can be configured to define, as part of the industrial control program, a state machine in accordance with state machine definition input received via the development interfaces rendered by the user interface component 204. The state machine can define a desired behavior of an automation system or machine in terms of possible machine states and transition events between the states. The resulting state machine definition can be included as part of the control program and deployed to the industrial controller as part of the configuration file, where the state machine is executed to perform control of the automation system in accordance with the state machine definition.

Device interface component 210 can be configured to deploy or download the configuration file generated by the configuration file generation component 206—including any device configuration parameters, tag definitions, control program routines, and state machine definitions—to an industrial controller, either via a direct connection to the controller or via a networked connection.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
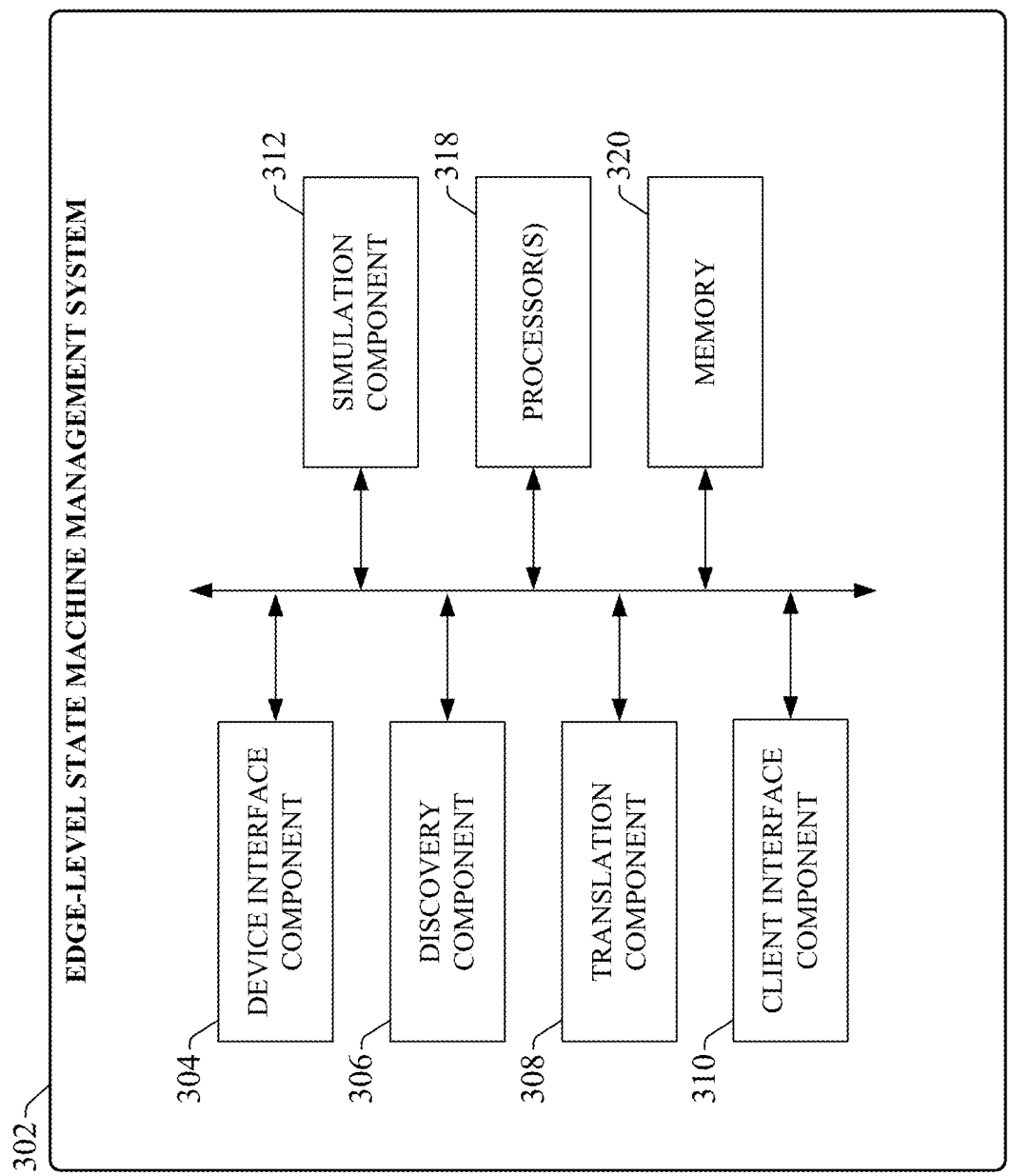
FIG. 3 is a block diagram of an example edge-level state machine management system that can translate controller-level state machine definitions to standardized information models and expose these information models to remote systems or applications.

FIG. 3 is a block diagram of an example edge-level state machine management system 302 that can translate controller-level state machine definitions to standardized information models and expose these information models to remote systems or applications, including cloud-based systems. State machine management system 302 can include a device interface component 304, a discovery component 306, a translation component 308, a client interface component 310, a simulation component 312, one or more processors 318, and memory 320. In various embodiments, one or more of the device interface component 304, discovery component 306, translation component 308, client interface component 310, simulation component 312, the one or more processors 318, and memory 320 can be electrically and/or communicatively coupled to one another to perform one or more of the functions of the state machine management system 302. In some embodiments, components 304, 306, 308, 310, and 312 can comprise software instructions stored on memory 320 and executed by processor(s) 318. State machine management system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Edge-level state machine management system 302 can execute on an edge device 126 that serves as a gateway between data on the control-level devices and external systems—e.g., cloud-based systems—that consume this data. Device interface component 304 can be configured to exchange information between applications on a cloud platform or other internal or external network and sources of industrial data at a plant facility. Sources of industrial data that can be accessed by the device interface component 304 can include, but are not limited to, industrial controllers, telemetry devices, motor drives, quality check systems (e.g., vision systems or other quality verification systems), industrial safety systems, cameras or other types of optical sensors, data collection devices (e.g., industrial data historians), or other such information sources. These industrial data sources can comprise devices of different types and vendors. Device interface component 304 can exchange data with these industrial devices via the plant networks on which the devices reside.

Discovery component 306 can be configured to discover and retrieve state machine definitions from industrial controllers residing on the plant network. Translation component 308 can be configured to translate these discovered state machine definitions to information models that can be read by client applications or other systems. Client interface component 310 can be configured to expose the information models to remote client applications for visualization of machine states, remote control of plant floor systems, or other such functions. Simulation component 312 can be configured to generate simulation data for testing interfaces between the edge-level system 302 and a client application, and between the edge-level system and an industrial controller.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
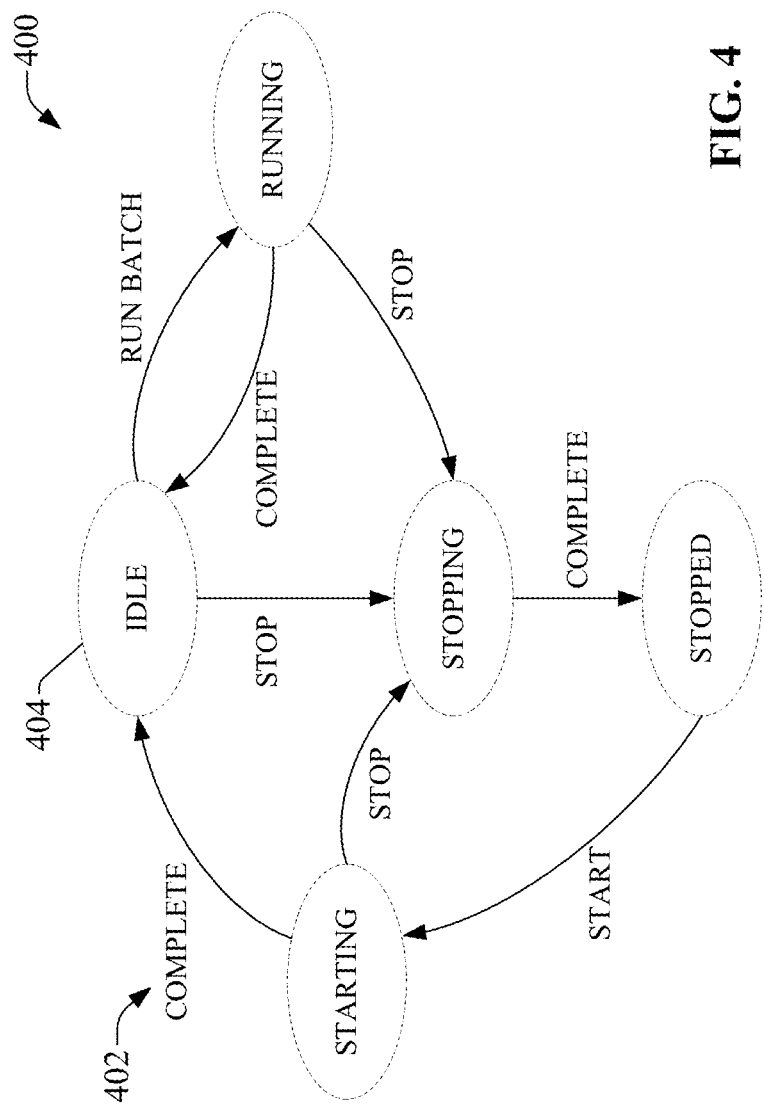
FIG. 4 is an example state machine representing states and transition events for an example automation system.

System designers often use state machine diagrams as a design tool for developing control programs for their automation systems. FIG. 4 illustrates an example state machine 400 representing states and transition events for an example automation system. In general, a state machine models a set of possible system states 404 as well as transition events 402 that cause the system to transition from one state to another. For example, according to state machine 400, if the system is currently in the "Idle" state and receives a "Run Batch" command, the system will transition to a "Running" state. While in the "Running" state, the system may receive either a "Complete" indication that causes the machine to transition back to the "Idle" state, or a "Stop" command that causes the system to transition to the "Stopping" state.

Figure 5:
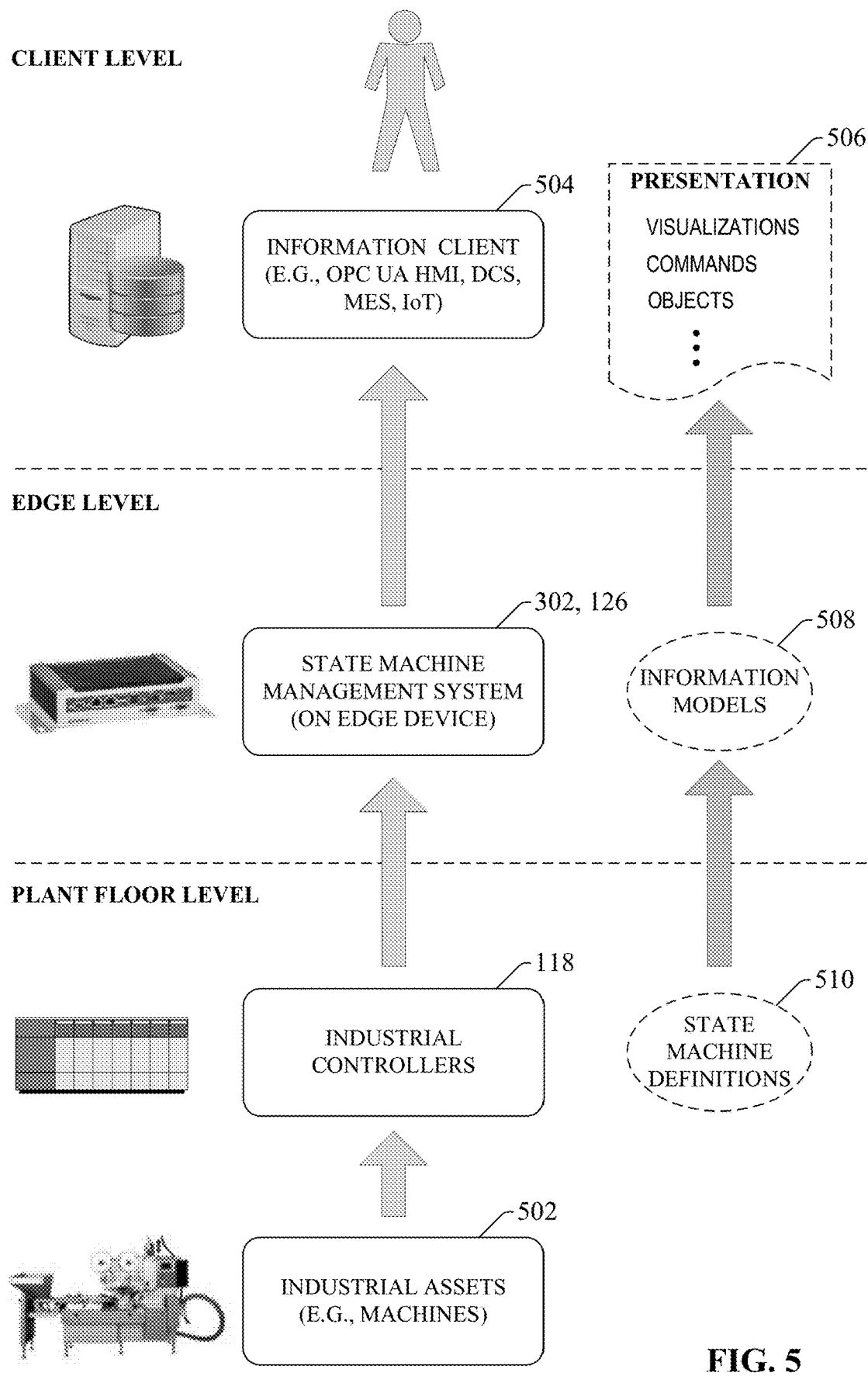
FIG. 5 is a diagram illustrating a general data flow implemented by embodiments of a edge-level state machine management system.

FIG. 5 is a diagram illustrating a general data flow implemented by embodiments of the edge-level state machine management system 302 according to one or more embodiments. As noted above, industrial controllers 118 on the plant floor monitor and control industrial assets 502 in accordance with defined control programs executed by the controller 118. These control programs may include state machine definitions 510 that define possible states of the industrial assets and transition conditions or commands for transitioning between the defined states. In some implementations, the state machine definition 510 may define high-level control flows in terms of machine states and their associated transition conditions, and the physical transitions between the defined machine states can be controlled by respective control routines defined in the control program under the supervisory control of the state machine definition 510. As will be described below, the state machine definitions 510 can be built using enhanced controller tags referred to herein as smart objects, whose properties allow the state machine definitions 310 to be discovered and translated to a standardized information model.

An edge device 126 on the edge level of the industrial facility executes the state machine management system 302, which can discover state machine definitions 510 on the industrial controllers 118 and transform these state machine definitions 510 to standardized information models 508 that are discoverable to information clients 504 or other remote systems. Information clients 504 can include, for example, systems that support OPC unified architecture (OPC UA), remote HMIs, IVIES systems, IoT systems, distributed control systems, or other such systems. The information models 508 generated by the state machine management system 302 expose the state machines and their associated rulesets to these external information clients 504, allowing those information clients 504 to discover, visually represent, and interact with the state machines, even if the clients 504 have no prior knowledge of those state machines. This is in contrast connectivity protocols such as OPC UA, in which information models must be pre-defined in an OPC UA sever and connected to data tags in the lower levels of the software architecture.

Figure 6:
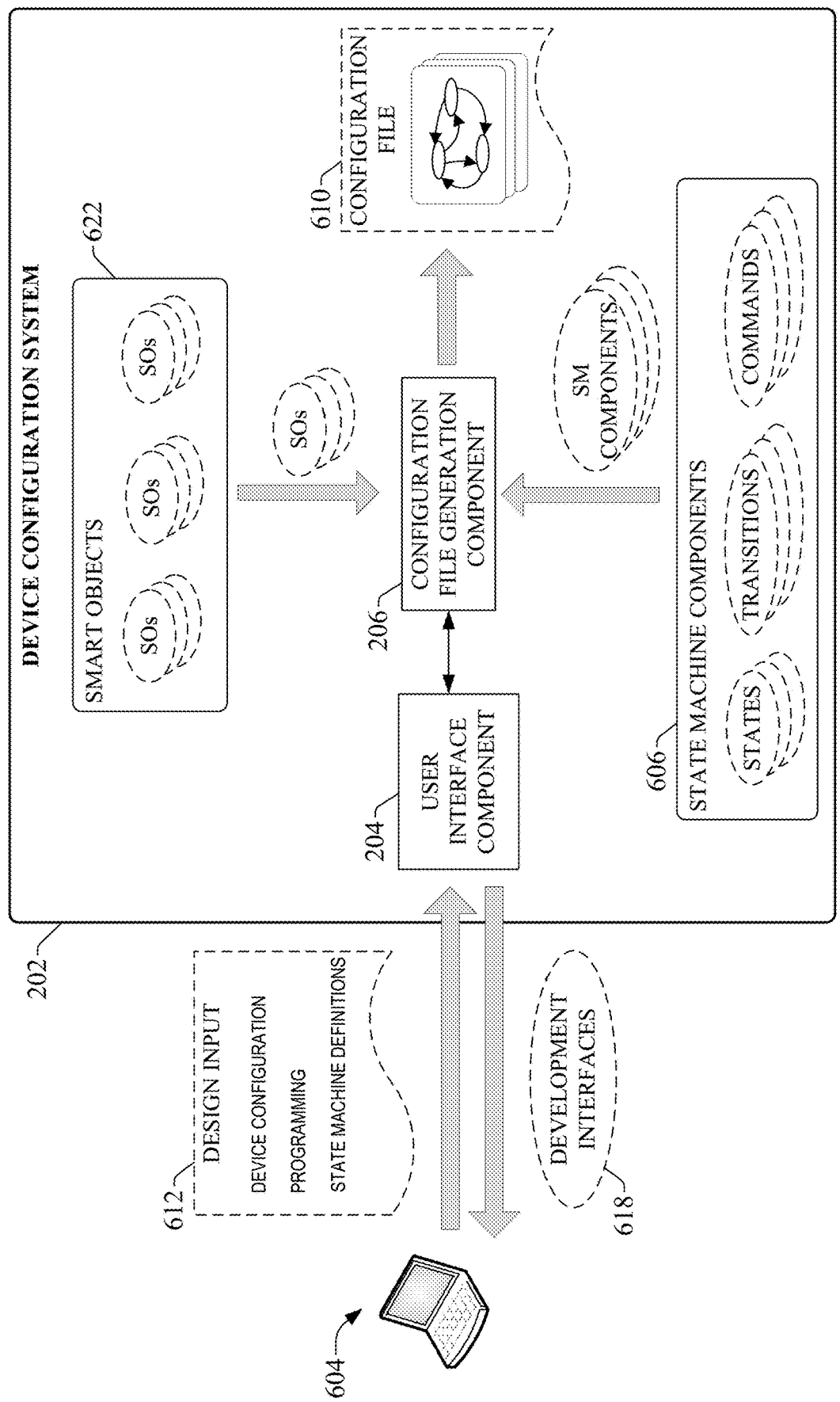
FIG. 6 is a diagram illustrating example data flows associated with creation of a controller configuration file for an industrial controller using a device configuration system.

FIG. 6 is a diagram illustrating example data flows associated with creation of a controller configuration file 610 for an industrial controller using device configuration system 202 according to one or more embodiments. Device configuration system 202 can be, for example, an industrial controller programming platform that creates a development environment for developing control programs (e.g., ladder logic programs, function block diagrams, sequential function chart programs, etc.) and configuring device parameters or settings for an industrial controller. A client device 604 (e.g., a laptop computer, tablet computer, desktop computer, mobile device, wearable AR/VR appliance, virtual machine, virtual desktop, etc.) can access the configuration system's project development tools and leverage these tools to create a configuration file 610 for an industrial controller 118 being programmed and configured. The system's user interface component 204 can generate and render development interfaces 618 on the client device 604, and through interaction with these development interfaces 618 developers can submit design input 612 to the configuration system 202 in the form of device configuration information and control programming. The control programming can include any state machine definitions that are to govern state transitions of an industrial machine or process that will be monitored and controlled by the industrial controller 118.

Figure 7:
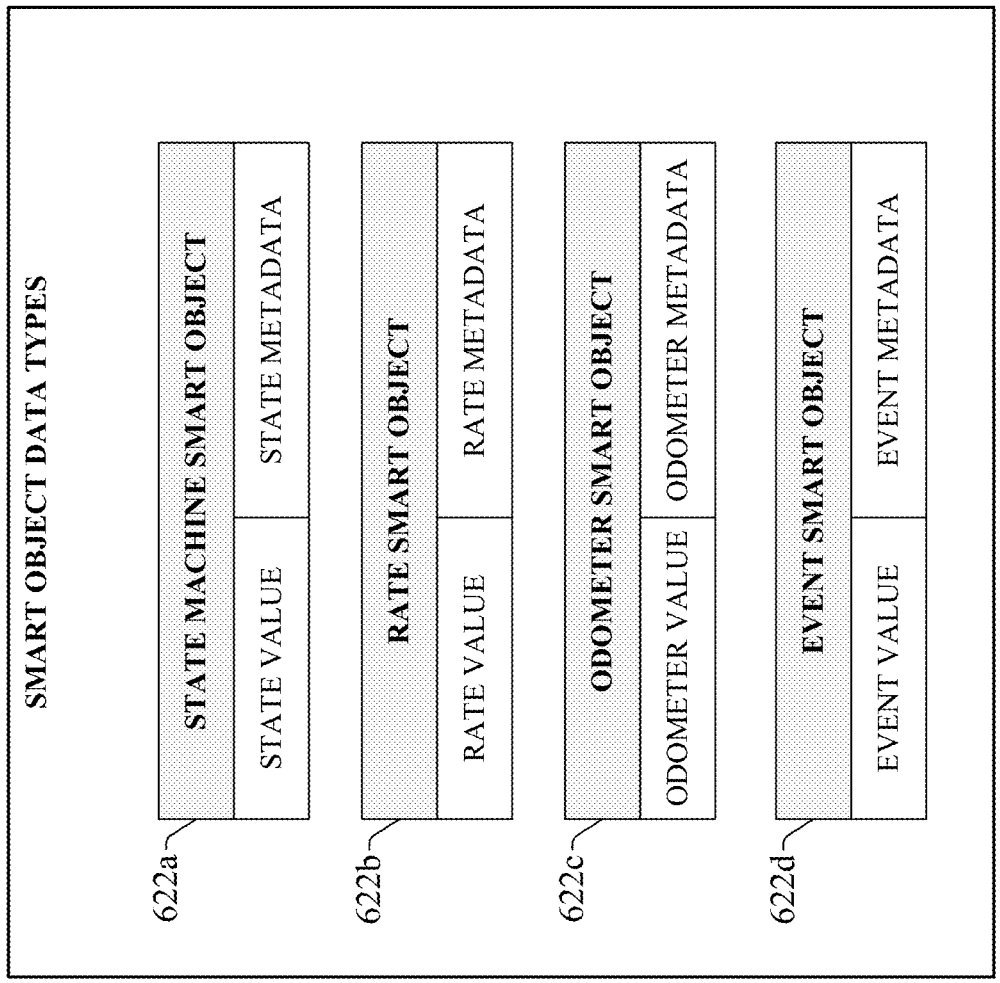
FIG. 7 is an illustration of four example smart object data types that can be supported by a device configuration system.

The configuration file 610 generated by device configuration system 202 can be built upon an object-based architecture that uses smart objects 622 as building blocks. Accordingly, as part of the design input 612, the user can select and configure smart objects 662 to be included in the controller's tag database. Smart objects 622 are enhanced data tags that can be defined and configured within the controller's tag database using the device configuration system 202. FIG. 7 is an illustration of four example smart object data types that can be supported by one or more embodiments of device configuration system 202. These data types can supplement other standard data types that are typically supported by industrial controllers or other industrial devices (e.g., integer, real, Boolean, string, floating point, UDTs, etc.). In general, data tags are data structures defined within an industrial device that reference a memory location within the device (e.g., an input value, an output value, or an internal data register) and correspond to respective data items. A data tag can be configured to be (or may be an instance of) of a specified data type, such as Boolean, floating point, integer, double integer, string, etc. During development, data tags to be stored in the controller's tag database can be created and configured by the user (as part of design input 612). The smart objects 622 described herein are additional data types that are catered to industrial automation applications, and that supplement conventional data types.

Various smart object data types can be supported by configuration system 202. Four example smart object data types are illustrated in FIG. 7—a State Machine smart object 622a, a Rate smart object 622b, an Odometer smart object 622c, and an Event smart object 622d. Although the examples described herein assume that the supported smart object data types comprise these four data types, it is to be appreciated that some embodiments may include other smart object data types without departing from the scope of this disclosure.

Each smart object 622 includes a field for storing the current value of the smart object (e.g., a State value, a Rate value, an Odometer value, and an Event value) as well as one or more metadata fields configured to store user-defined configuration data for that smart object 662. The metadata values for each smart object 662 can customize management and presentation of the associated smart object data value in accordance with the particular industrial asset or industrial application with which the smart object 662 is associated.

The value contained in a State Machine smart object 622a can represent a current state of an industrial asset or device (e.g., a machine, a production line, a motor drive, etc.). The state data contained in a State Machine smart object 622a can represent one of a set of predefined states representative of a current state or status of the associated industrial asset or device. For example, the State Machine smart object 622a may convey an S88 state (allowing the State Machine smart object 622a to be referenced by a state machine definition), a Packaging Machine Language state, a current state of a state machine defined for the asset, a state of a valve (e.g., OPEN or CLOSED), a state of a motor (e.g., RUNNING, IDLE, FAULTED, etc.), or other types of states.

User-configurable metadata associated with the State Machine smart object 622a (which can be configured by the user via design input 612) may define a state machine representing available states of the associated asset, where each defined state is configured to be invoked in response to a detected condition. For example, each defined state may be linked via the metadata to one or more other related data tags defined in the industrial controller 118 (e.g., a data tag representing a state of a sensor or switch indicative of the defined state), such that the current state indicated by the State Machine smart object 622a is related to the current values of the related data tags. In the same way the smart objects for State, Transition, Cause, Composition State, or other state machine properties can present relationships and current values.

The value contained in a Rate smart object 622b can represent an integer or real value of a measured rate of a metric associated with the industrial asset or device. The rate value may be an instantaneous rate or a value representing a rate of change of the metric over time. For example, the rate value contained in the Rate smart object 622b can represent a temperature, a pressure, a velocity (e.g., a velocity of a conveyor or other motor-driven machine component), an overall equipment effectiveness (OEE), or other such metric.

User-configurable metadata associated with the Rate smart object 622b can define maximum and minimum values for the corresponding rate value, such that the value contained in the Rate smart object 622b will not deviate outside the window defined by the maximum and minimum value metadata. The metadata can also identify one or more data sources (e.g., one or more other data tags or input addresses) that determine the event. For example, the metadata for the Rate smart object 622b can define whether the corresponding rate value is an aggregation of multiple other values contained in other defined data tags. In this regard, the user can define the rate value to be an average or a sum of two or more identified data tags, or an integral of a data tag over time. Another metadata field can be used to designate an engineering unit to be associated with the rate.

The value contained in the Odometer smart object 622c can represent a cumulative quantity associated with an industrial asset. For example, the Odometer smart object 622c can be configured to represent cumulative quantity with a rollover value, such as a part count associated with the industrial asset. In such cases, the metadata associated with the Odometer smart object 622c can include a definition of the rollover value. The Odometer smart object 622c may also be configured to represent a quantity over a defined time interval, such as an energy consumption associated with the asset. In the case of quantities over a defined time interval, the metadata associated with the Odometer smart object 622c can include a definition of the time interval, which may be defined in terms of daily start and end times, in terms of a start time and a defined duration of the time interval, or as another time definition format. The metadata associated with the Odometer smart object 622c can also define one or more data sources that drive the odometer value. For example, the metadata may define a data tag associated with a Cycle Complete event, such that the odometer value will increment when the Cycle Complete data tag goes high. The odometer value may also be defined to be an aggregation of multiple values. In such cases, the metadata may identify two or more data tags whose values are to be aggregated or summed to yield the odometer value. The metadata can also define a unit of measure associated with the odometer value (e.g., bottles filled, operating cycles, megawatt-hours, etc.).

The value contained in the Event smart object 622d can represent an instantaneous or persistent event associated with an industrial asset. For example, an Event smart object 622d may represent an instantaneous event such as a push-button event (e.g., "Service Button Pushed"), a sensor event (e.g., "Part Present," "Person Detected," etc.), a safety device event (e.g., "Light Curtain Broken"), or another such instantaneous event. Persistent events that can be represented by Event smart object 622d can include, but are not limited to, events associated with an alarm status (e.g., "Alarm Unacknowledged," "Alarm Acknowledged," etc.). Other examples of persistent events that can be represented by an Event smart object 622d can include persistent events with an identifier and a state. For example, events associated with a batch process can include a batch number (an identifier) and an associated event (e.g., "Starting," "Executing," "Complete," etc.). User-configurable metadata associated with the Event smart object 622d can include identifiers of other data tags whose states, in aggregation, determine the event to be represented by the Event smart object 622d. Alternatively, if the event represented by Event smart object 622d is a function of only a single input (e.g., a push-button input), the metadata can identify the appropriate input address of the industrial device.

In addition to the metadata described above for each smart object data type, the smart objects 622 may also include configurable metadata fields that define communication or discovery parameters for the respective smart objects 622. For example, each smart object 622 may include an Update Rate metadata parameter that allows the user to set the rate or frequency at which the smart object 622 sends its data to an edge device 126 in order to update a corresponding data presentation at an information client 504. Such metadata fields may allow the user to set the update period for the smart object 622 (e.g., a 60 second period, which causes the smart object 622 to send updated values every 60 seconds), or to specify that the smart object 622 is to send its updated value substantially continuously (e.g., every 5 milliseconds to 10 seconds).

It is to be appreciated that the smart objects 622 described above in connection with FIG. 7 are intended to be exemplary, and that other types of smart objects 622 are also within the scope of one more embodiments of this disclosure.

Figure 8:
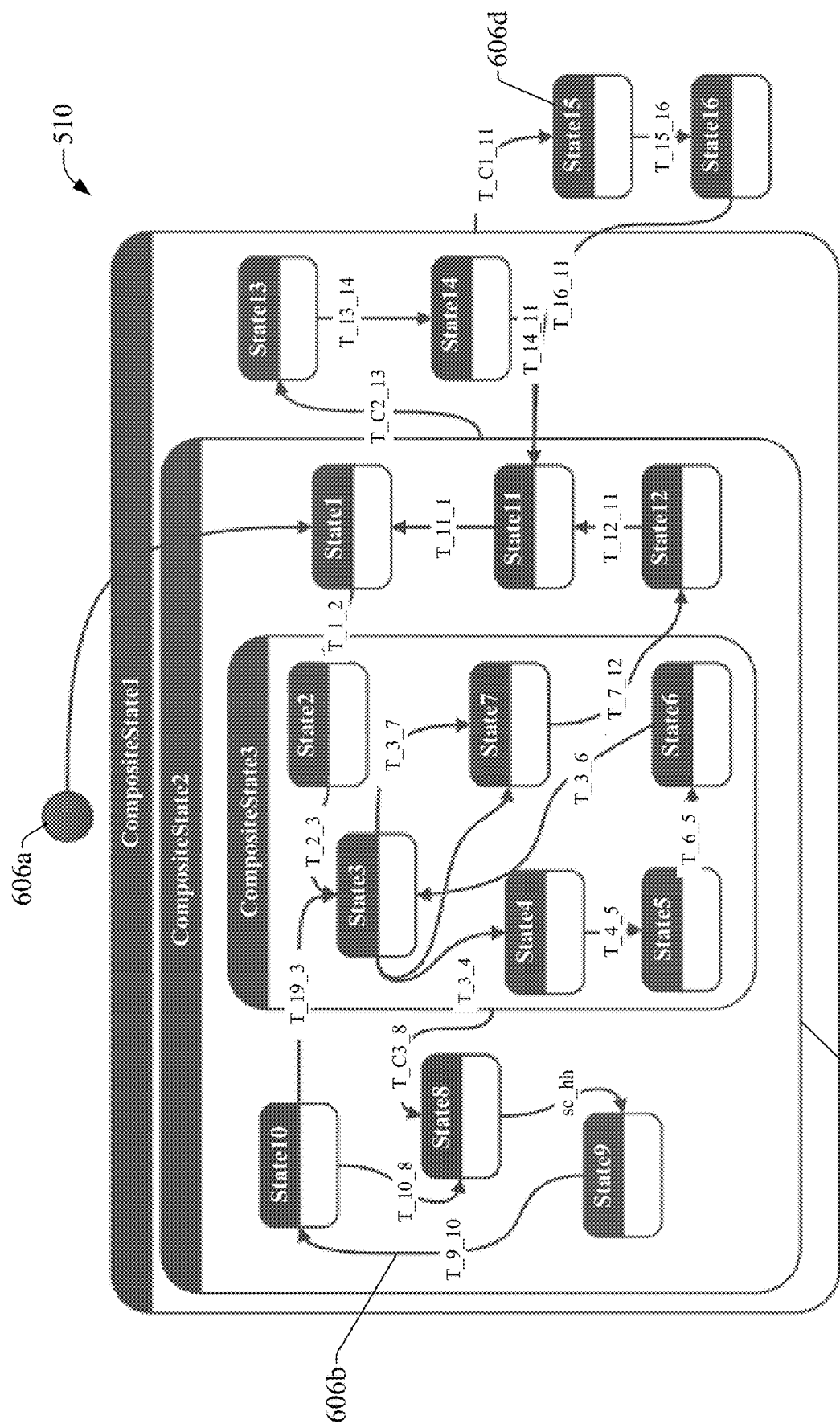
FIG. 8 is an example state machine definition built using modular state machine components.

Returning now to FIG. 6, the device configuration system 202 also supports development of state machine definitions to be included as part of the control program. In particular, the development platform allows state machines definitions to be built from module state machine components 606 available in a state machine component library. The modular state machine components 606 can include components representing machine states, transitions from a first state to a second state, commands for triggering the transitions, and transition paths. In some embodiments, the modular state machine components 606 can also include components representing composite states. FIG. 8 is an example state machine definition 510 built using modular state machine components. This example state machine 802 includes a number of state components 606d representing states of an automation system, industrial asset, industrial process, or other controlled entity. Transition components 606b have been added that define transitions between the state components 606d. These transition components 606b can be associated with events (e.g., by linking the transition components 606b to specified Event smart objects 622d) that are to trigger the transition between states. Additionally, Composite state components 606c are used to group multiple state modules 806 into a composite state, allowing transitions to be defined to and from the composite group of states as a whole. An initial state component 606a can be used to specify a state component 606d to be used as the initial state for the state machine 810. In affect, any of the entity types of object management group unified modeling language (OMG UML) State Machines can be included in the component library.

During development, the user can define a desired state machine by selecting and combining modular state machine components 606 and selectively linking these components 606 to smart objects 622. For example, state components 606d or composite state components 606d can embed or be linked to a State Machine smart object 622a corresponding to a state to be represented by the state component 606d. Similarly, transition components 606b defining a transition path between a first state and a second state can embed or be linked to Transition smart objects which in turn can be linked to cause smart objects that trigger the transition between those states. These smart objects 622 can be exposed to higher level systems—such as an edge device 126 executing state machine management system 302—by the industrial controller during subsequent operation, as will be described in more detail below.

Underlying rulesets associated with the respective state machine components 606 can enforce executional integrity of the resulting state machine during development. For example, if the user combines a set of state machine components 606 in a manner that yields a state machine having a dead-end condition (e.g., a transition to a state with no possible transitions to other states) or other untenable features, the user interface component 204 can generate a warning identifying the error in the state machine design, and the system 202 can prevent the state machine from being deployed in its current erroneous state. In this way, state machines are pre-validated within the development platform prior to deployment to the controller 118.

Figure 9:
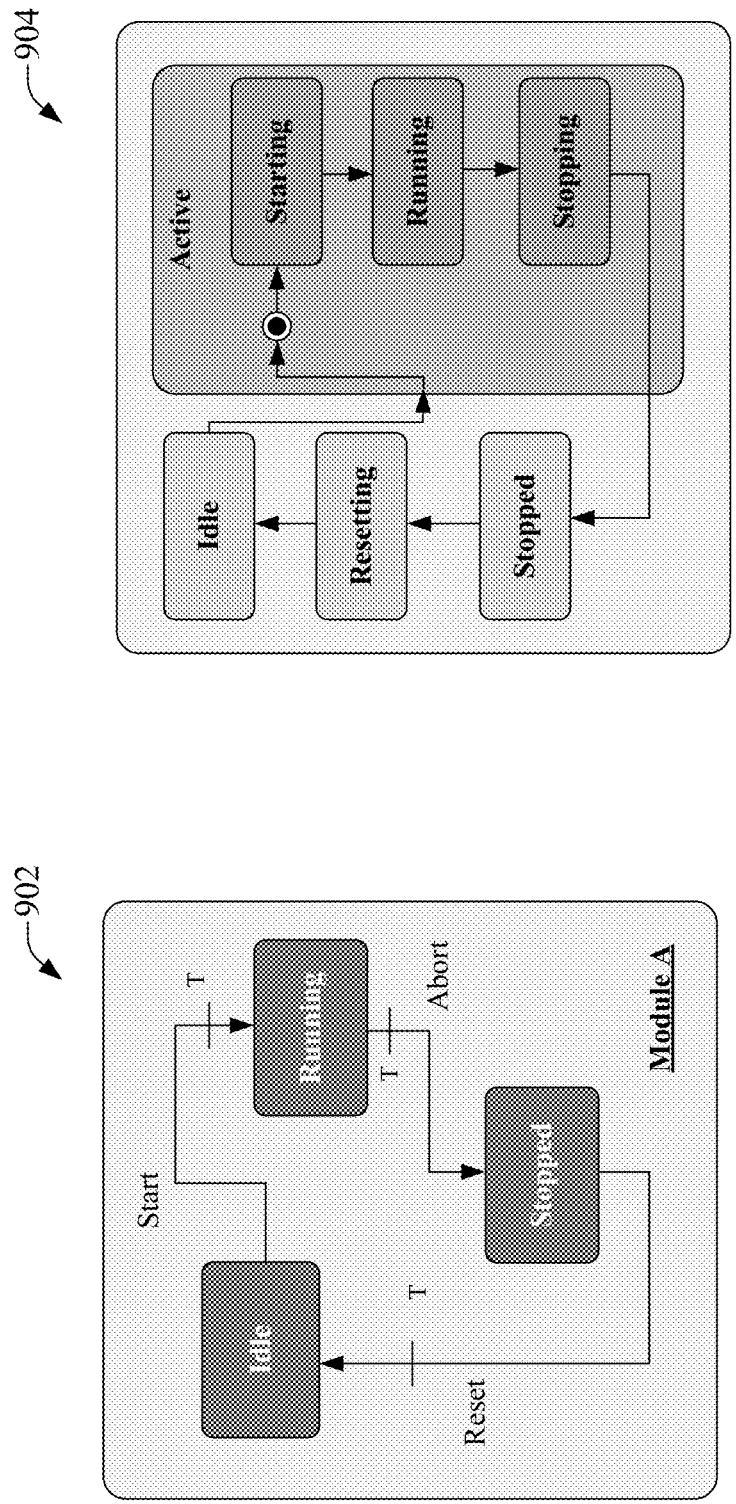
FIG. 9 is an illustration of two example state machine visualizations.

Some embodiments of device configuration system 202 can also allow the user to define visualization properties for the state machine, where these visualization properties specify how the state machine is to be rendered by an HMI system or other type of visualization client. FIG. 9 is an illustration of two example state machine visualizations. In general, a state machine visualization definition can specify the arrangement of icons representing the states defined for the state machine in terms of the relative locations of the icons, the colors used to indicate whether a given state icon is currently active or inactive, labels designated to the state icons or the transition paths between states, or other such visualization properties. These visualization properties can be stored with the state machine definition 510 as metadata that can be read and translated by a visualization system to render an animated version of the state machine whose visual properties are set based on the metadata and live values of the relevant data tags corresponding to the machine states.

Figure 10:
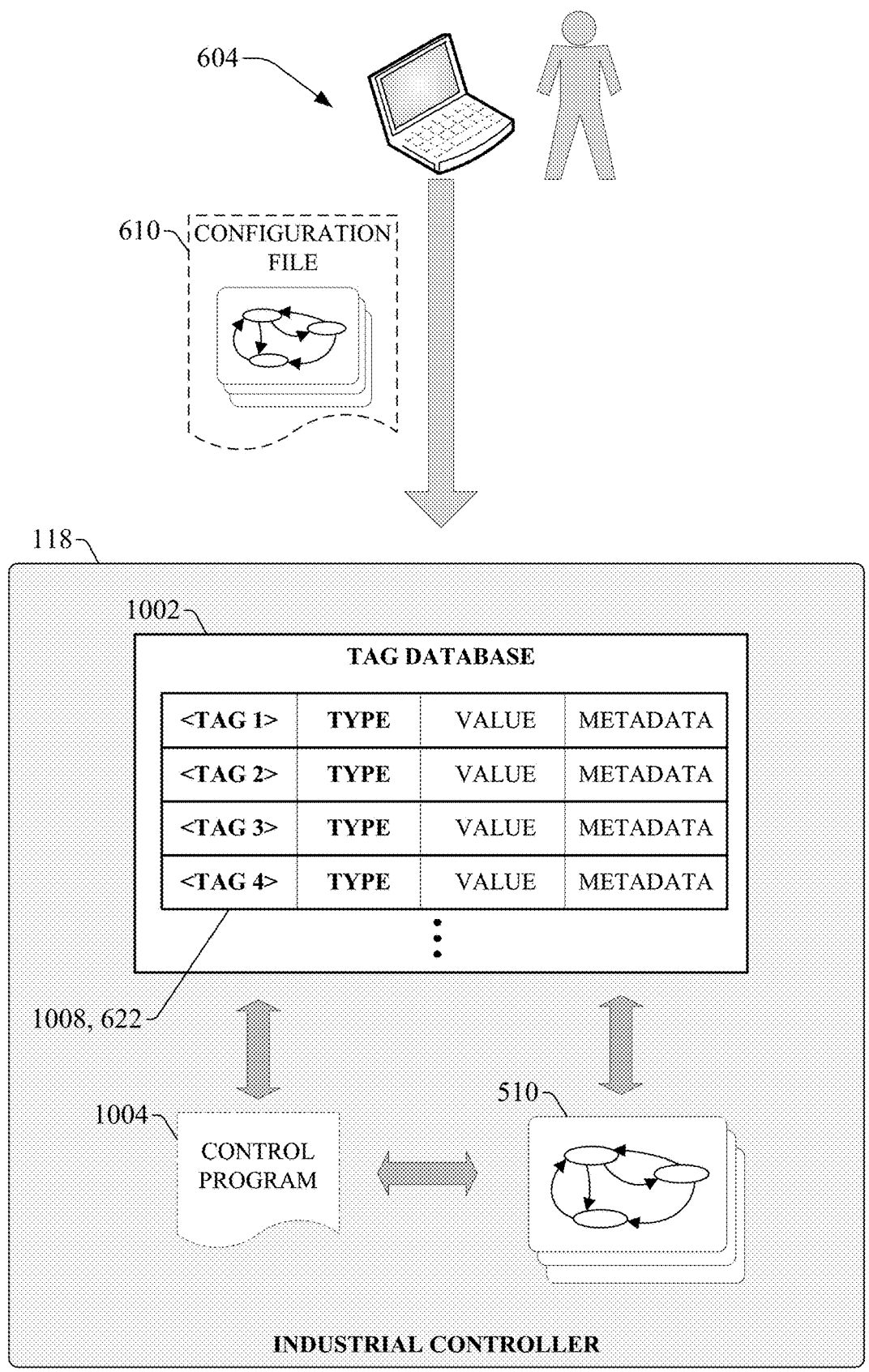
FIG. 10 is a diagram illustrating deployment of a configuration file to an industrial controller.

Returning again to FIG. 6, once the user has completed defining the device configuration (including definition of data tags and smart objects 622) and developing the control program (including defining any desired state machine definitions as discussed above), the configuration file generation component 206 generates a configuration file 610 that can be deployed and executed on the industrial controller 118. FIG. 10 is a diagram illustrating deployment of the configuration file 610 to an industrial controller 118. The configuration file 610 includes the controller configuration settings (e.g., data tag and smart object definitions, networking configuration settings, I/O definitions, scale factors, etc.) and industrial control program 904 (including any state machine definitions 510) developed by the user within the development environment of the device configuration system 202.

Industrial controller 118 includes a tag database 1002 that stores data tag definitions. As discussed above, the data tag definitions are configured by the user in tandem with development of control program 1004 (e.g., a ladder logic program, a sequential function chart program, etc.), and define data tags 908 of various data types that are used to store and identify analog and digital data values generated and consumed by the control program 1004 and the state machine definitions 1006. Example standard data types that can be represented by data tags 908 can include, for example, integer data types, real data types, Boolean data types, etc.

In addition to these standard data types, one or more of the data tags 1008 can include smart objects 622 associated with the smart object data types described above. As described above, the user can configure the metadata associated with each smart object 622 in order to customize the smart objects 622 for a given industrial application. For example, for a State Machine smart object 622a associated with a bottle filling machine to be controlled by industrial controller 118, the user may specify the various states to be represented by the smart object 622a (e.g., Running, Home, Abnormal, Idle, etc.).

For a Rate smart object 622b representing a velocity of a conveyor that feeds bottles to the filling machine, the user can specify maximum and minimum values for the velocity value. Accordingly, the Rate smart object 622b will not generate a velocity value that is outside the range defined by the defined maximum and minimum values, and may generate an error or alarm output if the measured velocity value exceeds the defined maximum or falls below the defined minimum. Another Rate smart object 622b representing an average temperature may be configured to average multiple analog temperature input values specified by the user in the metadata. For an Odometer smart object 622*c* representing a product count (e.g., the number of filled bottles output by the filling machine), the user can configure the associated metadata to define the data tag that triggers an increment of the odometer value (e.g., an input tag or another smart object 622 representing a "fill cycle complete" event), as well as daily shift start and shift end times between which the value of the Odometer smart object 622*c* will increment before being reset to zero. Metadata of an Event smart object 622*d* associated with a component of the filling machine can define an input address or data tag representing a state of a device (e.g., a push-button, a photo-sensor, etc.) that determines the event, or an alarm data tag corresponding to an alarm whose state (e.g., Abnormal, Normal, Acknowledged, Unacknowledged, etc.) determines the event.

Figure 11:
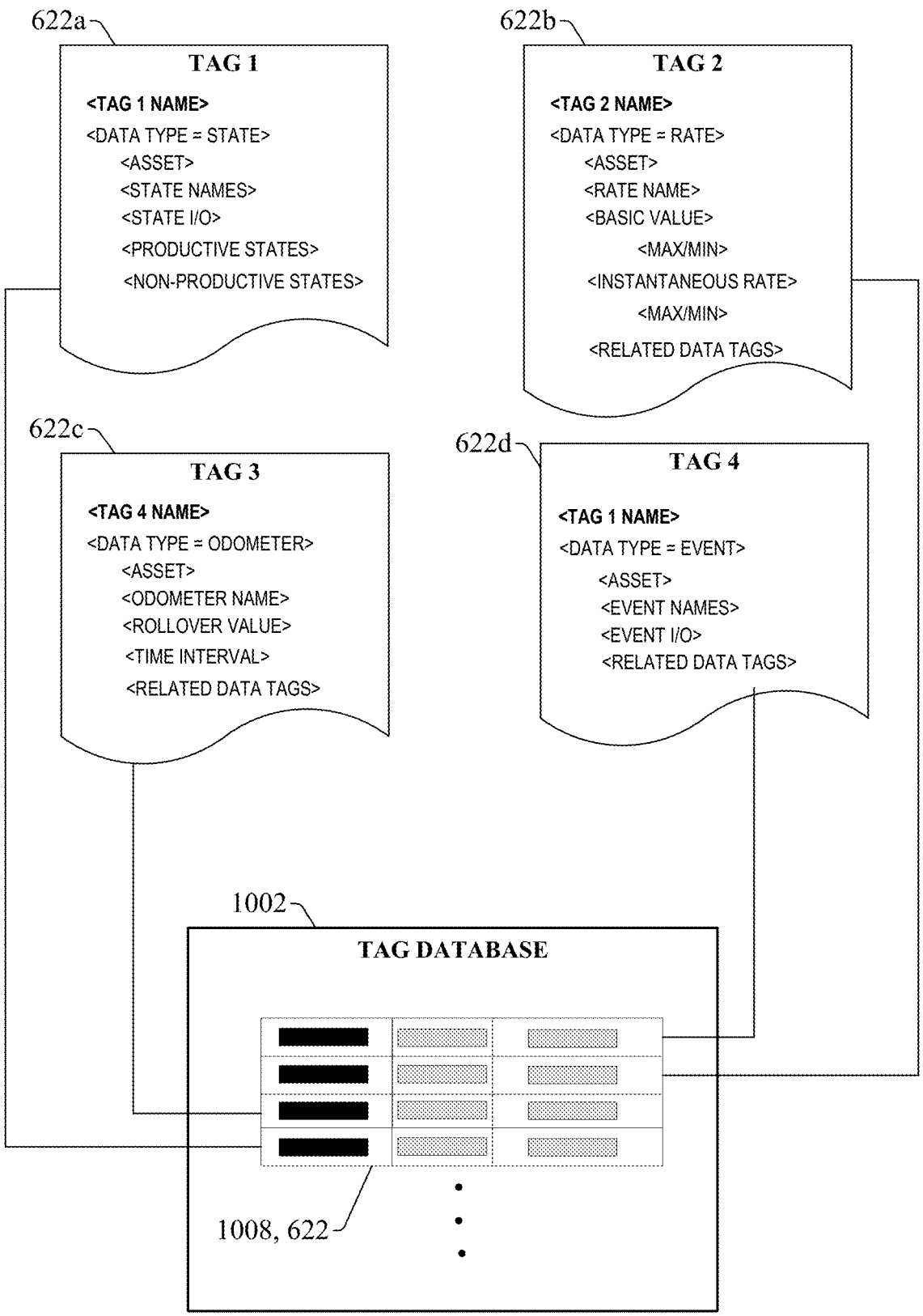
FIG. 11 is a diagram illustrating storage of smart objects in tag database.

Deployment of the configuration file 610 to the industrial controller 118 configures the controller's tag database 1002 in accordance with the user-defined data tags 908 and smart objects 622, such that the tag database 1002 stores the configured data tags 908 and smart objects 622 on the industrial controller's memory, where the data tags 1008 and smart objects 622 are accessible by control program 1004 and state machine definitions 510. FIG. 11 is a diagram illustrating storage of smart objects 622 in tag database 1002, which shows example data fields for respective types of smart objects 622. In the example depicted in FIG. 11, data tag 1 is a State Machine smart object 622*a* with metadata fields for a name of an industrial asset associated with the tag (e.g., a name of a bottle filling machine, a die cast furnace, a stamping press, etc.), names of the states represented by the smart object 622*a*, identification of one or more device inputs or other data tags that determine the states, identification of productive and non-productive states, etc.

Data tag 2 is a rate smart object 622*b* with metadata fields for an industrial asset name, a name of the rate represented by the rate value (e.g., Line 3 Conveyor Velocity), maximum and minimum values for a basic rate value and/or for an instantaneous rate, related data tags whose values are aggregated to obtain the rate value, a unit for the rate value, or other such metadata fields. Data tag 3 is an Odometer smart object 622*c* with metadata fields for an asset name, a name of the odometer value (e.g., Bottles Filled, #4. Die Cast Energy Consumption, etc.), a rollover value representing a value of the odometer value at which the value will return to zero, a time interval during which the odometer value is to be incremented (e.g., a start and end time corresponding to a work shift), one or more related data tags that trigger an increment of the odometer value, a unit associated with the odometer value, or other such metadata fields. Data tag 4 is an Event smart object 622*d* with metadata fields for an asset name, names one or more events represented by the Event smart object 622*d*, identification of one or more inputs or data tags that determine the event, or other such metadata data fields.

It is to be appreciated that the metadata fields described above in connection with FIG. 11 are only intended to be exemplary, and that the metadata for a smart object 622 can have any suitable set of data fields that allow the user to align the smart object 622 with the industrial application carried out by the industrial controller 118.

Figure 12:
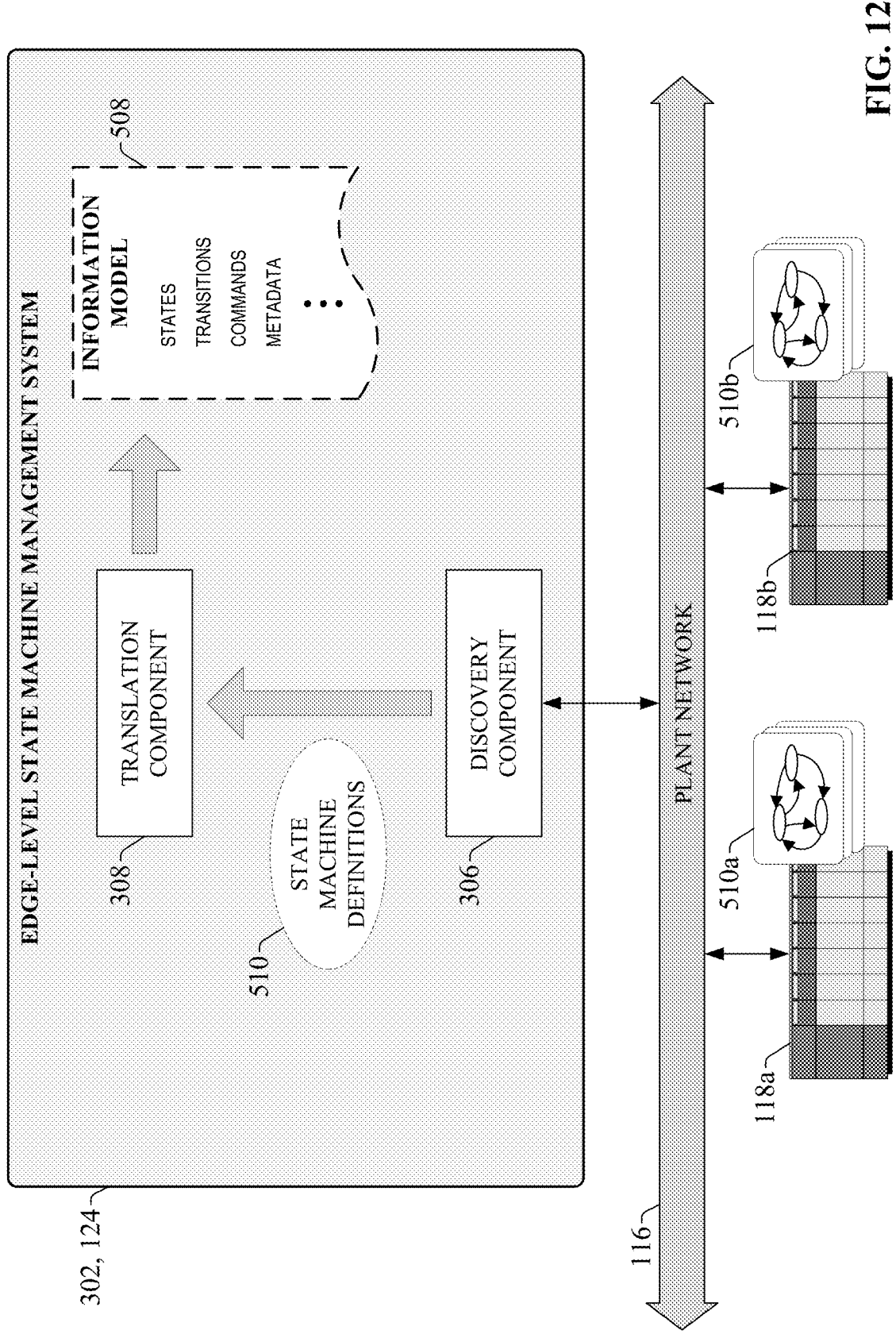
FIG. 12 is a diagram illustrating discovery and translation of state machine definitions to an information model.

Once the configuration file 610 has been deployed to the industrial controller 118, the controller 118 can execute the control program 1004 (including any state machine definitions 510 associated with the program 1004) to facilitate monitoring and controlling an industrial automation system or process. If an edge device 126 executing the edge-level state machine management system 302 is also installed at the plant facility, the state machine management system 302 can discover, translate, and expose the state machine definitions 510 to remote client or information systems. FIG. 12 is a diagram illustrating discovery and translation of state machine definitions 510 to an information model 508. The discovery component 306 of the state machine management system 302 can communicatively interface with, or poll, any industrial controllers 118 deployed on the plant network 116 and examine the controllers' device configurations to determine whether one or more state machine definitions 510 are executing on those controllers 118. If a state machine definition 510 is discovered on an industrial controller 118, the discovery component 306 retrieves the state machine definition 510, including any metadata associated with the definition 510.

Discovery of the state machine definitions 510 by the state machine management system 302 (as well as by applications that remotely access the state machines via the state machine management system 302) is facilitated in part by the modular state machine components 606 and the smart objects 622 on which the state machine definitions 510 are build. In this regard, the industrial controller 118 can expose the core state machine components 606 that make up the state machine definition 510, as well as the data and metadata of the associated smart objects 622, to the edge-level state machine management system 302, thereby rendering the state machine properties (states, composite states, transitions, paths, commands, etc.) and their underlying smart object data and metadata accessible and retrievable by the discovery component 306 of the state machine management system 302.

In some embodiments, discovery component 306 can be configured to identify and retrieve state machine definitions 510 from a range of different types of controllers 118, including controllers 118 made by different vendors. In this regard, the discovery component 306 can be configured to discover and interpret state machine definitions 510 in different formats, including vendor-specific formats.

Figure 13:
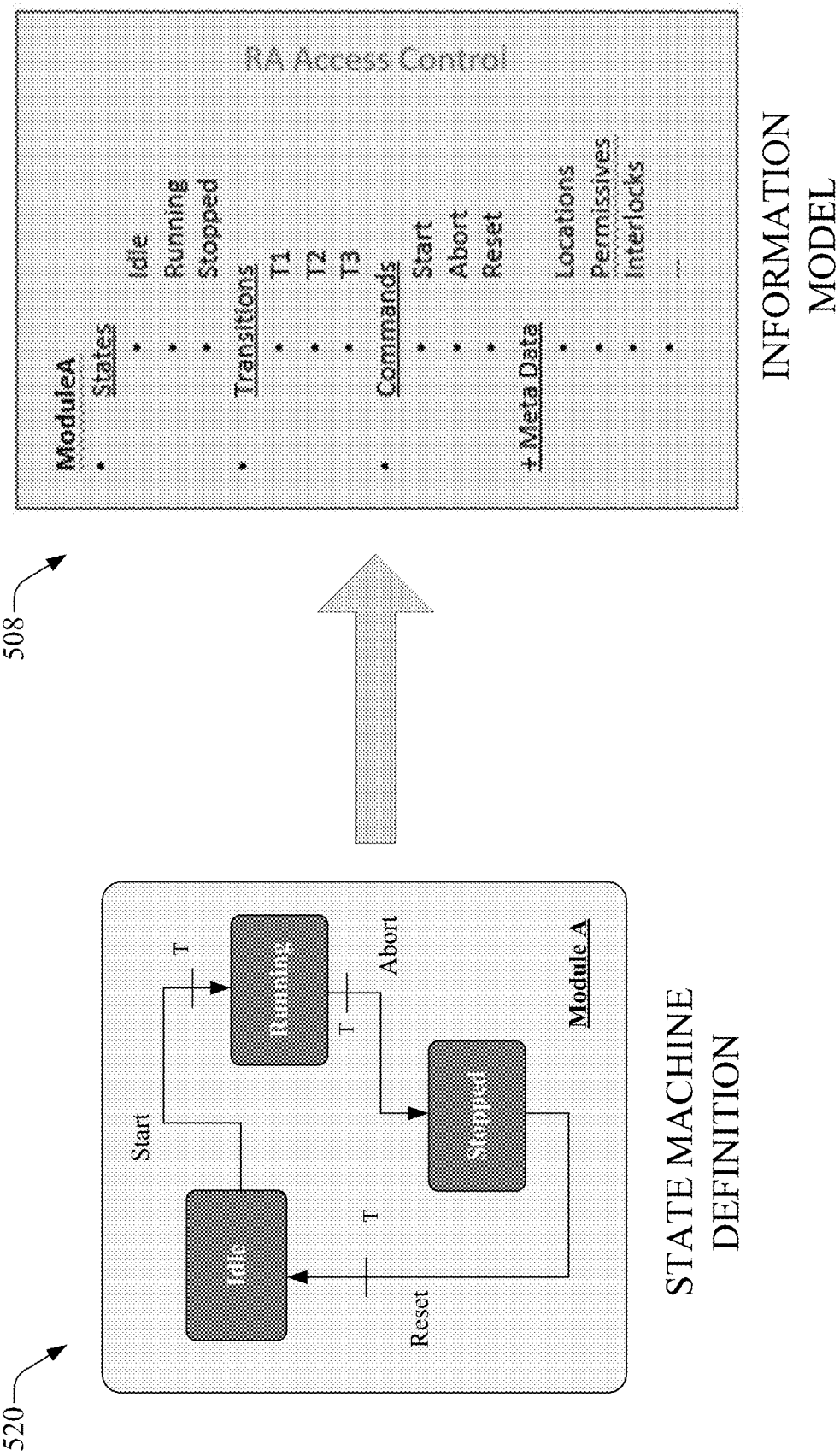
FIG. 13 illustrates an example translation from a state machine definition to an information model by an edge-level state machine management system.

Once the state machine definition 510 has been retrieved, a translation component 308 of the state machine management system 302 translates the state machine definition 510 to an information model 508 having information attributes based on the relational model defined by the underlying modular state machine components 606. In an example embodiment, the translation component 308 can identify the state machine components 606 that make up the state machine definition 510 and their defined relationships to one another, and map these components 606 and associated relationships to elements of the information model 508. FIG. 13 illustrates an example translation from a state machine definition 510 to an information model 508 by the translation component 308. In this example, a state machine definition 510 comprises three states—Idle, Running, and Stopped—and associated transitions T1-T3 between these states, with each transition associated with a command— Start, Abort, and Reset—that triggers the corresponding transition. As described above, these states, transitions, and commands had previously been defined as part of the controller's configuration file 610 using modular state machine components 606 linked embedded or linked to smart objects 622. Translation component 308 can identify the components 606 of the state machine definition 510 and map these components 606 to elements of the information model 508. The information model 508 can also include, for each state machine component 606, a link to the smart object 622 associated with that component.

If the state machine definition 510 has associated metadata—such as visualization metadata defining a visual arrangement of the states, color codings for active and inactive states, the existence of permissives or interlocks, or other metadata—the translation component 308 can also include this metadata in the information model 508.

The state machines are extensible such that ancillary subcomponents (e.g., setpoint parameters, permissives, interlocks) and their associated smart objects can be linked to the state machine components and also made discoverable and representable in the same way as the components of the state machines.

Figure 14:
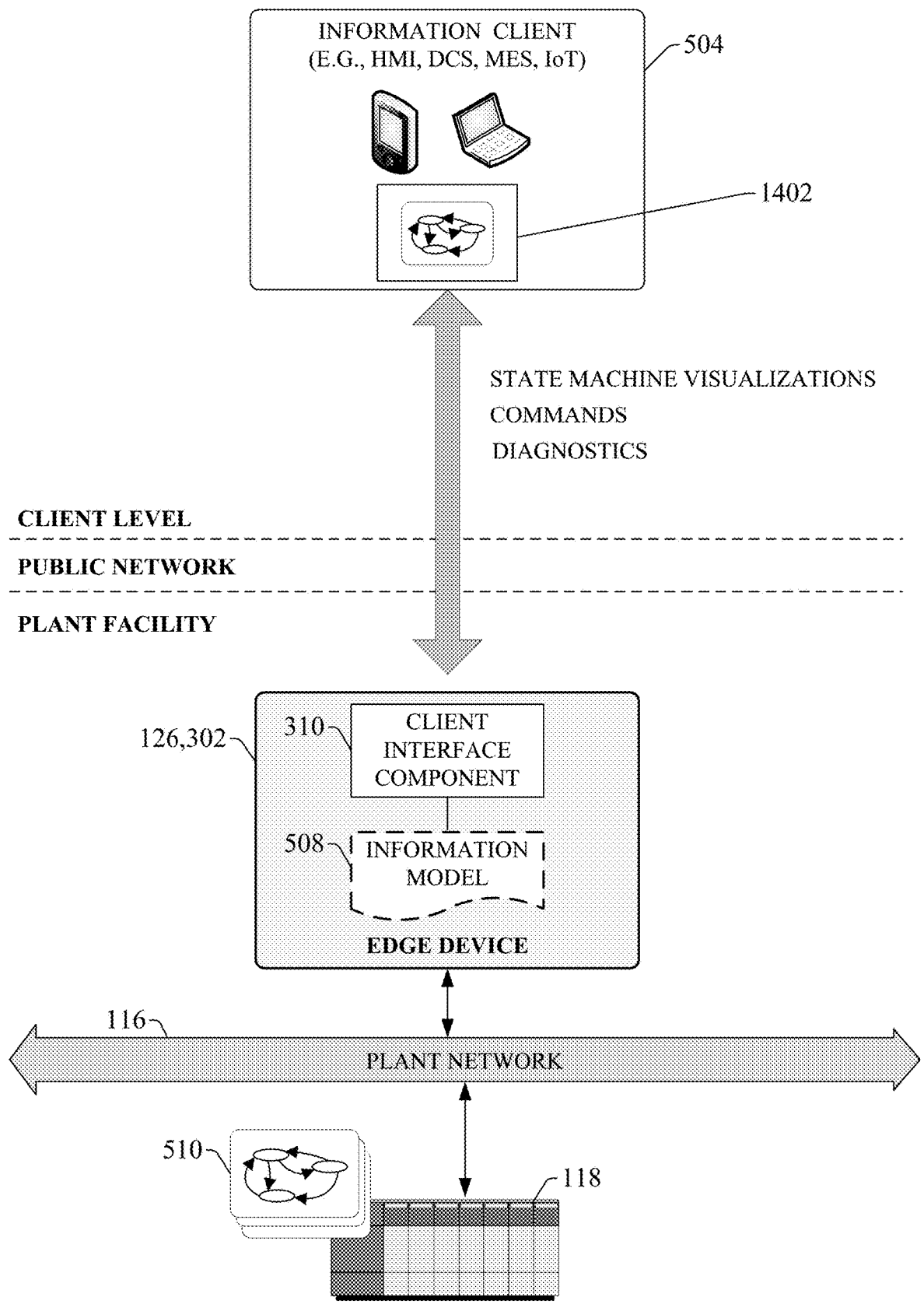
FIG. 14 is a diagram illustrating an architecture in which a state machine management system, executing on an edge device, exposes a state machine definition residing on an industrial controller to remote information clients and/or client devices.

The state machine management system 302 executing on the edge device 126 can use the information model 508 to expose or present the components of the state machine to clients having access to the edge device 126. FIG. 14 is a diagram illustrating an architecture in which the state machine management system 302, executing on edge device 126, exposes the state machine definition 510 residing on the industrial controller 118 to remote information clients 504 and/or client devices 1404. The client interface component 310 of the state machine management system 302 can present the state machine components and relationships defined in the information model 508 (translated from the original state machine definitions 510) to clients 504 that remotely access the edge device 126. In this regard, clients 504 can remotely access the edge device 126 (and the state machine management system 302 that executes on the edge device 126) via a public network such as the internet, and the client interface component 310 provides a secure connection between the client 504 and the edge device 126 (e.g., using symmetric or asymmetric keying, such as TSL, SSL, or AES). Example clients 504 that can interface with the state machine management system 302 can include, but are not limited to, remote HMIs, MES systems, Internet of Things systems, clients that support OPC UA protocol, clients that support MQT protocol, distributed control systems, mobile personal devices, or other such clients.

The client interface component 310 can use the information model 508 to expose, to clients 504, the underlying state machines and their associated data that reside on the industrial controller 118, allowing applications on those clients 504 to consume, process, and/or visualize the state machines and their associated data. This can include, for example, rendering a visualization 1402 of the state machine on the client 504 and animating this visualization 1402 with live smart object data obtained from the industrial controller 118. Since the information model 508 defines mappings to the state machine components 606 and their associated smart objects 622, the client interface component 310 can securely expose both the state machine and its underlying tag or smart object data to the client 504. If the information model 508 includes visualization metadata that had been attached to the state machine definition 510 (e.g., metadata that defines a visual arrangement of the states and color definitions for active and inactive state statuses), the client interface component 310 can render the state machine visualization 1402 in accordance with this metadata.

In some implementations, the client interface 310 allows bidirectional interactions between the underlying state machine and the client 504, such that in addition to rendering a visualization of the state machine, the system 302 allows the user to submit remote commands to the state machine via the edge device 126. These commands can correspond to the commands associated with the transitions between states defined by the state machine definitions 510 (and encoded in the information model 508). The client interface component 310 can determine the defined commands associated with the state machine based on the information model 508 and expose these commands as methods or executable that can be accessed by applications on the clients. Depending on the type of client-side application, the command may be submitted to the controller 118 from the client 504 (via the edge device 126) in response to a user's interaction with the rendered state machine visualization 1402, or may be generated by a client-side application that has been designed to interface with the state machine methods exposed by the state machine management system 302 using the information model 508.

The edge-level state machine management system 302 can include security features that ensure that commands issued by the client 504 through the edge device 126 are executed with integrity. These features can include, for example, verification that incoming commands from the client 504 have been issued by authenticated and authorized personnel or systems. The client interface component 310 can also enforce rules that prevent invalid commands or values and manage unexpected behavior (e.g., disabled states, uninitialized states, setpoint limiting, communications failure, etc.). The system 302 can also include diagnostic tools that convey to the client 504 whether a command issued to the edge device was successfully conveyed to and executed by the controller 118, or alternatively whether the command failed or timed out.

In some embodiments, the state machine management system 302 can produce a record or log of state machine actions, commands, and interactions. This can include, for example, producing a record of the commands or value changes sent to the controller-level state machine from respective clients 504, as well as a record of state machine actions that either originate in the controller itself or are initiated by commands received from the clients. Each record of a state machine can comprise such information as a type of action being logged (e.g., a transition from a first state to a second state, a path for the state transition, a command received from a client, a value change for a parameter, etc.), a time-stamp for the action, user identity, an identity of a relevant client 504 (e.g., the client from which the command was received), value change (including previous value and new value), or other such information. The edge-level system 302 can also log security-related events, such as attempts to access the state machine through the edge device 126 by unauthorized clients or applications. The edge-level system can obtain at least some of the data included in a given event record from the smart objects 622 linked to the smart object components 606 that make up the state machine definition 510. Since this activity is tracked and logged at the edge-level, the system 302 can maintain event logs for multiple controllers 118 on which state machines are defined, including heterogeneous collections of controllers of different models or vendors. In some embodiments, the system 302 can maintain these event logs locally on the edge device 126. Alternatively, the system 302 can send the logged data to an external data storage system for archival storage.

Some embodiments of the state machine management system 302 can also execute automatic test functions that allow the user to test and validate interactions and commands between the edge-level system 302 and the client 504 without the need for the edge-level system 302 to be connected to the controller 118. In such embodiments, the edge-level system 302 can implement a testing mode whereby the client interface component 310, using the information model 508, renders a visualization 1402 of the state machine on the client 504 and animates the visualization 1402 using simulated test data generated by the state machine management system's simulation component 312 (see FIG. 3), rather than live data from the controller 118 itself. This simulation also allows the user to submit test commands from the client 504 to the edge-level system 302. Upon receipt of a test command from the client 504, the state machine management system's simulation component 312 simulates the behavior of the physical machine in response to the command, and the client interface component 310 updates the visualization 1402 based on the simulated result. Other types of client-side applications that interact with the state machine model can also be tested in this manner. In this way, the user can test the client-side application and its interactions with the state machine prior to connecting the edge device 126 to the physical controller 118.

Similarly, some embodiments of the state machine management system 302 can support test functions that test the link between the edge-level system and the controller 118 without the need for the client 504 to be connected to the edge device 126. This can include verifying, at the edge device 126, commands sent from the edge-level system 302 to the controller 118 and the responses that will be seen at clients 504 in response to those commands. Since the edge-level system can simulate the state machines to the client 504 and can also facilitate autonomous interaction with the state machine to the automation layer, client applications and automation applications can be developed and tested independently before being integrated via the edge device 126.

The edge-level state machine management system 302 described herein, working in conjunction with modular, discoverable state machine components and their underlying rulesets, provides a platform that allows client applications to discover, visually represent, and interact with state machines executing on the control level of an industrial enterprise even if those client applications have no prior knowledge of those state machines. This eliminates the need to pre-define an information model on the client-level or server-level and programmatically connect the model to the tag data in the control level, thereby mitigating considerable development work that would otherwise be necessary to connect client-level applications to the control-level state machines. The controller development platform allows a user to create new state machine implementations from mutually defined sets of modular components, and the edge-level system 302 discovers and represents these state machines on a client application, allowing the user to interact with the state machines via a client-side user interface, HMI, or other application. The system 302 also allows third-party systems to discover and interface with control-level state machines, facilitating secure remote control of those machines from their custom applications.

Moreover, the modular state machine components 606 enforce the integrity of the state machine at the control level, eliminating the need for manual validation and testing. Client applications inherit the integrity of the discovered state machines by virtue of the state machine component types and their associated rules.

Figure 15:
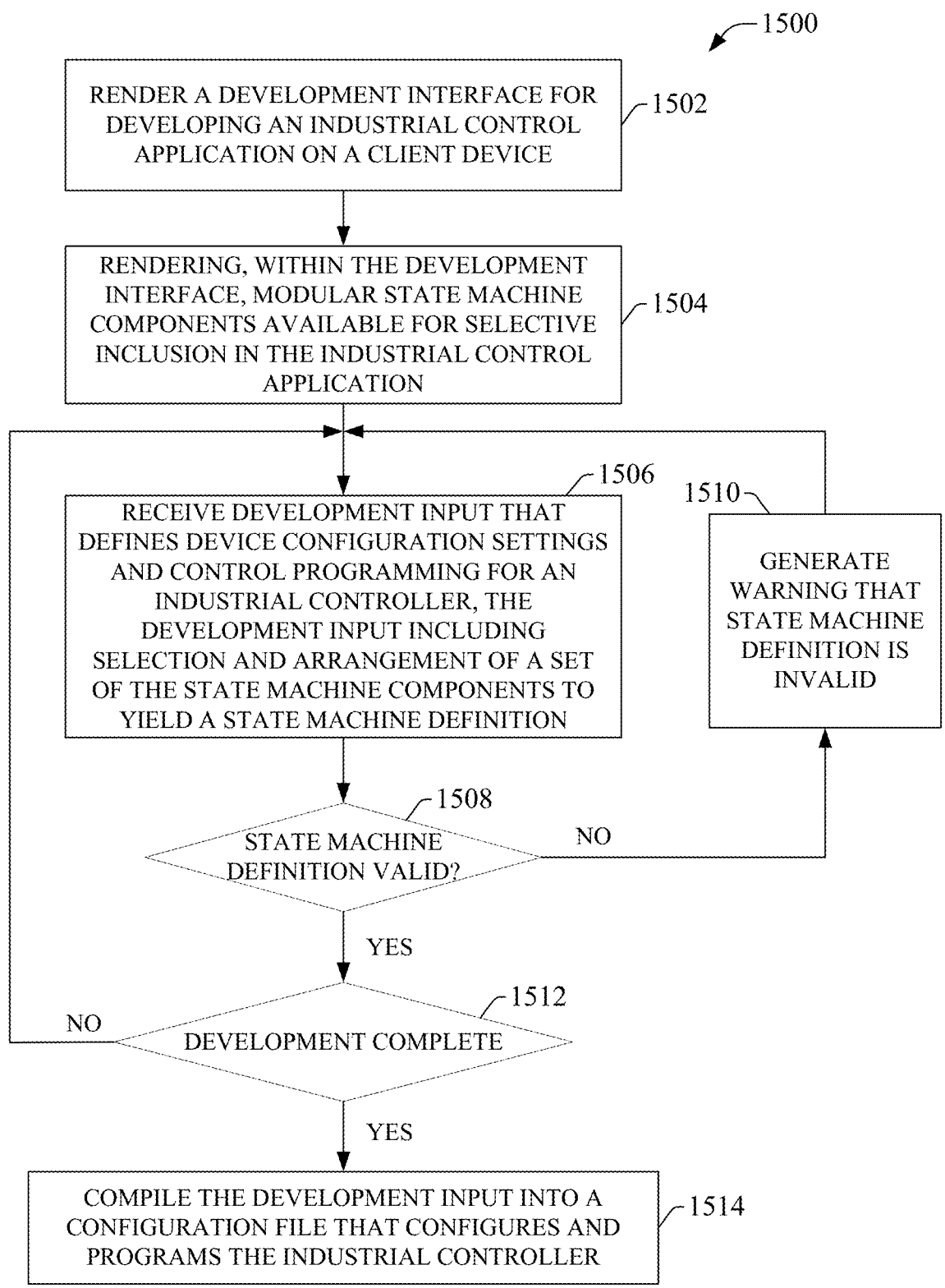
FIG. 15 is a flowchart of an example methodology for developing an industrial control program that includes discoverable state machine definitions.
Figure 16:
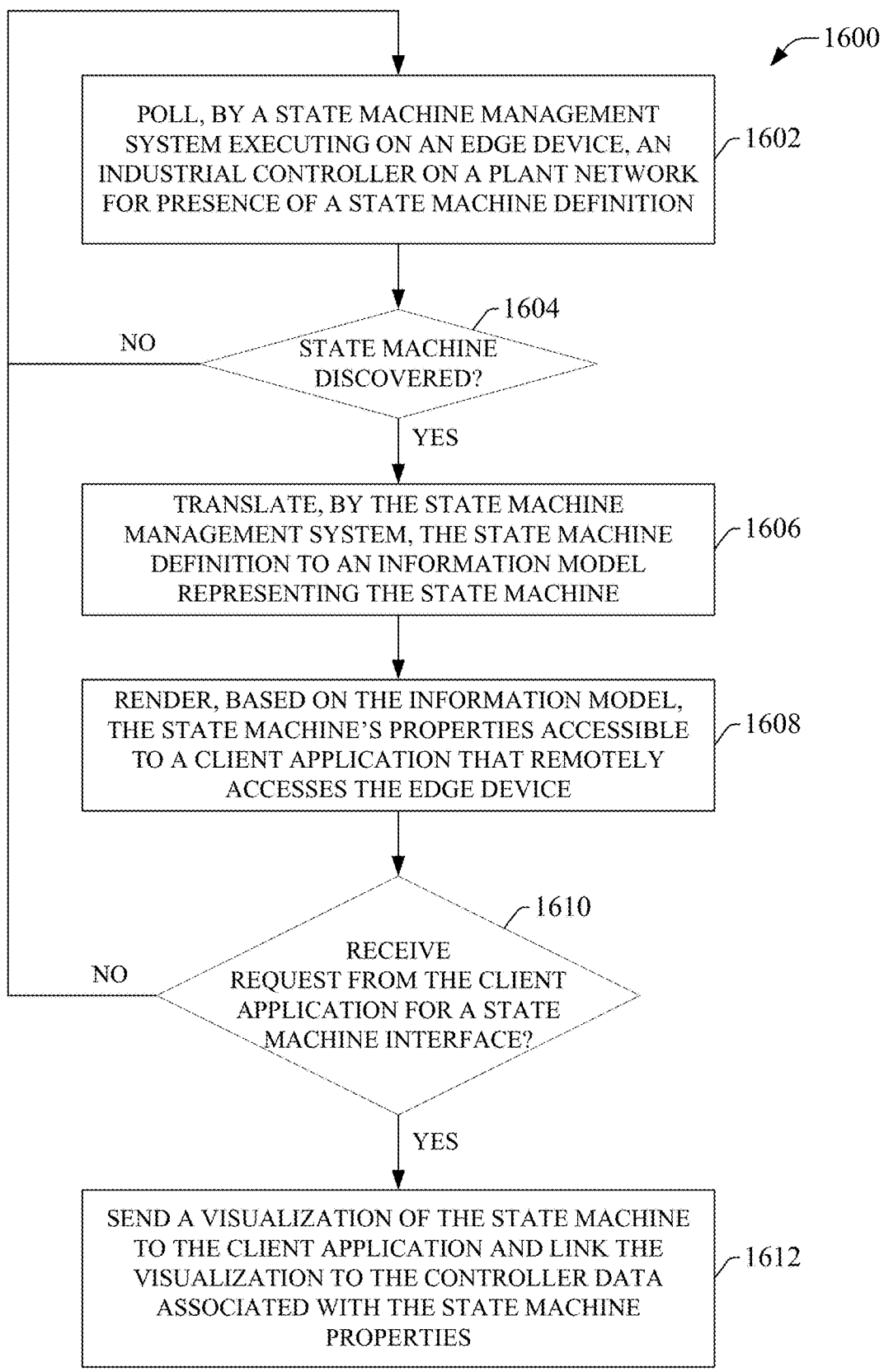
FIG. 16 is a flowchart of an example methodology for rendering control-level state machines discoverable and accessible by client applications via an edge device.

FIGS. 15-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for developing an industrial control program that includes discoverable state machine definitions. Initially, at 1502, a development interface for developing an industrial control application is rendered on a client device. The development interface can serve as a platform for developing control programs (e.g., ladder logic programs) and device configuration settings for an industrial controller. At 1504, modular state machine components are rendered within the development interface for selection. These modular state machine components are predefined programmatic elements that are available for selective inclusion in the industrial control application, and can be selectively assembled by the user to form state machine definitions that are executable within the industrial controller.

At 1506, development input is received via a user's interaction with the development interface. This development input defines device configuration settings and control programming for the industrial controller. The development input also selects and arranges a set of the state machine components to yield a state machine definition to be executed by the industrial controller as part of the control program. The modular state machine components have underlying rulesets that prevent arrangements of the state machine components that yield a state machine with untenable or undesirable states (e.g., dead-end conditions or other impermissible control states).

At 1508, a determination is made as to whether the state machine definition created at step 1506 is valid. This determination can be made by the development system based on the rulesets for the selected state machine components and the arrangement of these components specified by the user. If the state machine definition is not valid (NO at step 1508), the methodology proceeds to step 1510, where the development interface generates a warning that the state machine definition is invalid. The methodology then returns to step 1506, and further development input is received (e.g., to correct the state machine definition).

If the state machine definition is valid (YES at step 1508), the methodology proceeds to step 1512, where a determination is made as to whether development of the control project is complete. If control project development is not complete (NO at step 1512), the methodology returns to step 1506 and development continues. Alternatively, if development is complete, the methodology proceeds to step 1514, where the development input received at step 1506 is compiled into a configuration file that, when downloaded to an industrial controller, configures and programs the controller in accordance with the programming and configuration specified by the development input (including the state machine definitions).

FIG. 16 illustrates an example methodology 1600 for rendering control-level state machines discoverable and accessible by client applications via an edge device. Initially, at 1602, a state machine management system executing on an edge device polls an industrial controller on a plant network for presence of a state machine definition (e.g., a state machine definition developed using methodology 1500 described above in connection with FIG. 15). At 1604, a determination is made as to whether a state machine definition is discovered on the controller. If no state machine definition is discovered (NO at step 1604), the methodology returns to step 1602. Alternatively, if a state machine definition is discovered on the controller (YES at step 1604), the methodology proceeds to step 1606, where the state machine definition is translated by the state machine management system to an information model representing the discovered state machine. This information model encodes the state machine's properties (e.g., states, transitions, paths, commands, metadata, etc.) as well as the links to the controller data corresponding to these properties (e.g., smart objects or other data tags on the controller) in a manner renders these state machine properties and data links discoverable and accessible by authorized client applications via the edge device.

At 1608, based on the information model generated at step 1606, the edge device renders the state machine's properties discoverable and accessible to a client application that remotely accesses the edge device. The client application may be, for example, an HMI or other type of visualization system, an MES system, a remote control application, or other such applications. At 1610, a determination is made as to whether a requested for a state machine interface is received from the client device. This may comprise, for example, a request from the client application to view the discovered state machine. If no such request is received (NO at step 1610), the methodology returns to step 1602. Alternatively, if a request for a state machine interface is received (YES at step 1610), the methodology proceeds to step 1612, where the edge device presents the information model of the state machine to the client application and the client application can derive visualization with data exchange to the controller data associated with the state machine's properties (e.g., State smart objects, Event smart objects, etc.). The visualization can be rendered on the client application as a graphical state machine whose visual states and transitions are animated based on the current values of the corresponding smart objects on the industrial controller, which are conveyed to the client application by the edge device.

Embodiments, systems, and components described herein, as well as control systems and automation environments in which various aspects set forth in the subject specification can be carried out, can include computer or network components such as servers, clients, virtual machines, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
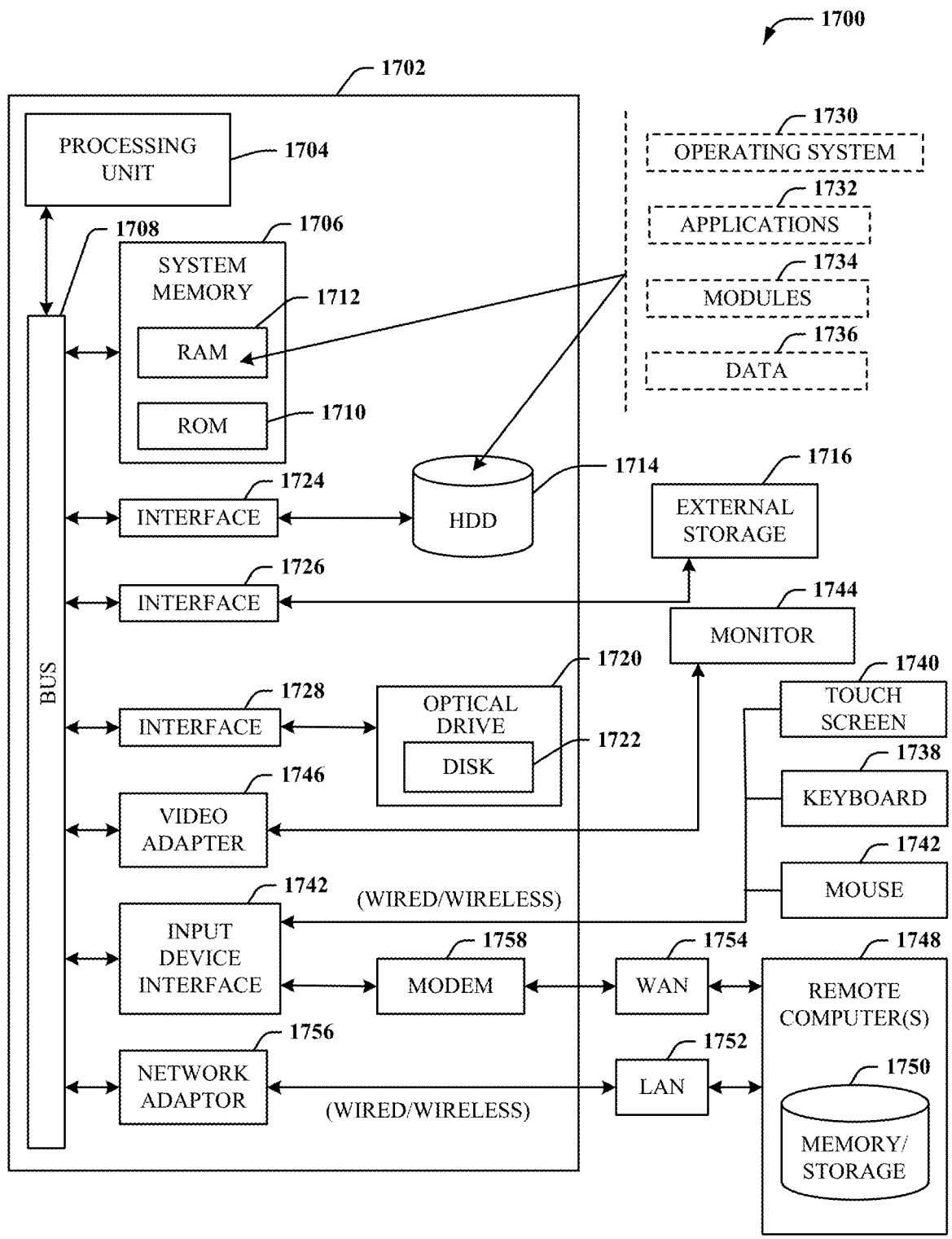
FIG. 17 is an example computing environment.
Figure 18:
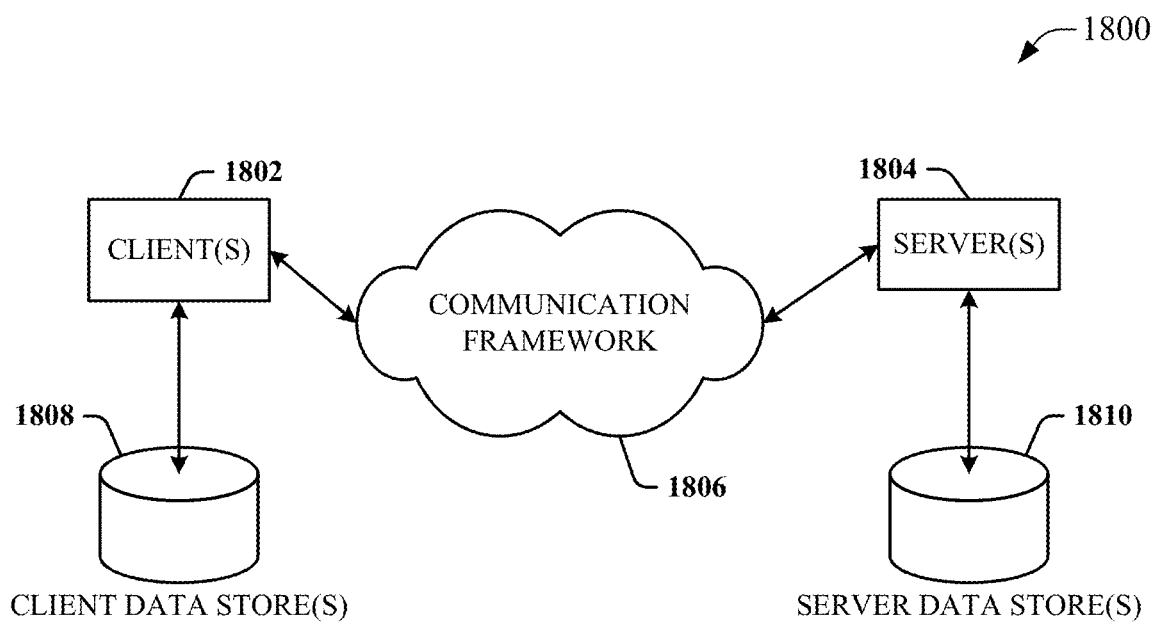
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for application programs 1732. Runtime environments are consistent execution environments that allow application programs 1732 to run on any operating system that includes the runtime environment. Similarly, operating system 1730 can support containers, and application programs 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless access point (AP) disposed thereon for communicating with the adapter 1756 in a wireless mode.

When used in a WAN networking environment, the computer 1702 can include a modem 1758 or can be connected to a communications server on the WAN 1754 via other means for establishing communications over the WAN 1754, such as by way of the Internet. The modem 1758, which can be internal or external and a wired or wireless device, can be connected to the system bus 1708 via the input device interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1752 or WAN 1754 e.g., by the adapter 1756 or modem 1758, respectively. Upon connecting the computer 1702 to an associated cloud storage system, the external storage interface 1726 can, with the aid of the adapter 1756 and/or modem 1758, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a device interface component configured to discover and retrieve a state machine definition from an industrial controller via a plant network;
a translation component configured to translate the state machine definition to an information model, the information model defining states, transitions, and commands of the state machine definition in a format that is discoverable, readable, and writable by a client application that remotely accesses the system; and
a client interface component configured to render the information model accessible to the client application, to render, on the client application, a graphical visualization of a state machine defined by the state machine definition, and to communicatively link properties of the graphical visualization to corresponding data tags or smart objects in the industrial controller.

2. The system of claim 1, wherein the system is embodied on an edge device that resides on the plant network and interfaces the plant network to an external network or cloud platform.

3. The system of claim 1, wherein
the information model translates metadata associated with the state machine definition that defines structural and relational properties of the state machine,
the client interface component is configured to render the graphical visualization in accordance with the metadata, and
the metadata defines at least one of relative locations of state icons representing states of the state machine, a color of the state icons representing an active state, or a color of the state icons representing an inactive state.

4. The system of claim 1, wherein the information model defines commands that are associated with state transitions defined by the state machine definition, and the client interface component is configured to expose the commands to the client application.

5. The system of claim 4, wherein the device interface component is configured to, in response to receipt of a command from the client application relay the command to a data tag or smart object associated with the command in the industrial controller,
wherein the command is one of the commands defined by the information model.

6. The system of claim 1, wherein the client application comprises at least one of a human-machine interface system, a manufacturing execution system (MES), a manufacturing operations management (MOM) application, an Internet of Things application, a control application associated with a distributed control system, a visualization application, a reporting application, or an analytic application.

7. The system of claim 1, wherein
the state machine definitions are built using modular state machine components representing the states, transitions, and commands, and
the modular state machine components are linked to or contain smart objects defined in the industrial controller.

8. The system of claim 7, wherein the smart objects conform to one of a set of smart object data types, the smart object data types comprising at least one of a state data type, a transition data type, a state machine data type, or an event data type.

9. The system of claim 1, the executable components further comprising a simulation component configured to generate simulated controller data in response to a test command received from the client application,
wherein
the simulated controller data simulates states of a state machine defined by the state machine definition, and
the client interface component sends the simulated controller data to the client application in response to the test command.

10. The system of claim 1, wherein the state machine definition comprises predefined modules representing subcomponents of a state machine that are related through their metadata values and that allow the state machine to be interacted with by the client application.

11. A method, comprising:
discovering and retrieving, by an edge device comprising a processor, a state machine definition from an industrial controller via a plant network;
translating, by the edge device, the state machine definition to an information model that defines states, transitions, and commands of the state machine definition in a format that is discoverable, readable, and writable by a client application that remotely accesses the edge device;
rendering, by the edge device, the information model accessible to the client application;
rendering, by the edge device on the client application, a graphical visualization of a state machine defined by the state machine definition; and
communicatively linking, by the edge device, visual properties and command inputs of the graphical visualization to corresponding data tags or smart objects in the industrial controller.

12. The method of claim 11, further comprising interfacing, by the edge device, the plant network with an internal network, an external network or a cloud platform.

13. The method of claim 11, wherein
the information model records metadata associated with the state machine definition that defines visual properties of the state machine,
the client interface component is configured to render the graphical visualization in accordance with the metadata, and
the metadata defines at least one of relative locations of state icons representing states of the state machine, a color of the state icons representing an active state, or a color of the state icons representing an inactive state.

14. The method of claim 11, wherein
the information model defines commands that are associated with state transitions defined by the state machine definition, and
the rendering of the information model accessible to the client application comprises permitting the client application to access the commands.

15. The method of claim 14, further comprising, in response to receipt of a command from the client application relaying, by the edge device, the command to a data tag or smart object associated with the command in the industrial controller,
wherein the command is one of the commands defined by the information model.

16. The method of claim 11, wherein the client application comprises at least one of a human-machine interface system, a manufacturing execution system (MES), an Internet of Things application, a control application associated with a distributed control system, a visualization application, a reporting application, or an analytic application.

17. A non-transitory computer-readable medium having stored thereon instructions that, in response to execution, cause an edge device comprising a processor to perform operations, the operations comprising:

discovering and retrieving a state machine definition from an industrial controller via a plant network;
translating the state machine definition to an information model that defines states, transitions, and commands of the state machine definition in a format that is discoverable, readable, and writable by a client application that remotely accesses the edge device;
rendering the information model accessible to the client application;
rendering, on the client application, a graphical visualization of a state machine defined by the state machine definition;
communicatively linking visual properties and command inputs of the graphical visualization to corresponding data tags or smart objects in the industrial controller.

18. The non-transitory computer-readable medium of claim 17, wherein the operations further comprise interfacing the plant network with an internal network, an external network or a cloud platform.

19. The non-transitory computer-readable medium of claim 17, wherein
the information model records metadata associated with the state machine definition that defines visual properties of the state machine,
the rendering of the graphical visualization comprises rendering the graphical visualization in accordance with the metadata, and
the metadata defines at least one of relative locations of state icons representing states of the state machine, a color of the state icons representing an active state, or a color of the state icons representing an inactive state.

20. The non-transitory computer-readable medium of claim 17, wherein
the information model defines commands that are associated with state transitions defined by the state machine definition, and
the operations further comprise permitting the client application to access the commands.

* * * * *